(12) United States Patent
Tateoka

(10) Patent No.: US 7,116,675 B2
(45) Date of Patent: Oct. 3, 2006

(54) METHODS AND SYSTEMS FOR TRANSFERRING PACKETS AND PREVENTING ILLICIT ACCESS

(75) Inventor: Masamichi Tateoka, Higashimurayama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 975 days.

(21) Appl. No.: 09/793,441

(22) Filed: Feb. 27, 2001

(65) Prior Publication Data

US 2002/0027907 A1    Mar. 7, 2002

(30) Foreign Application Priority Data

Aug. 21, 2000 (JP) .............................. 2000-249724

(51) Int. Cl.
 *H04L 12/54* (2006.01)
(52) U.S. Cl. .................. 370/429; 370/230; 709/224; 713/154
(58) Field of Classification Search ............... 370/230, 370/235, 389, 392, 401, 412, 428, 429; 713/200, 713/201, 202, 153, 154, 160, 161, 191; 709/224
See application file for complete search history.

(56) References Cited

U.S. PATENT DOCUMENTS

| | | | |
|---|---|---|---|
| 5,434,863 A * | 7/1995 | Onishi et al. ............... 370/402 |
| 5,606,668 A * | 2/1997 | Shwed ........................ 713/201 |
| 5,796,942 A | 8/1998 | Esbensen | |
| 6,009,528 A * | 12/1999 | Teraoka ...................... 713/201 |
| 6,295,278 B1 * | 9/2001 | Ohkura et al. ............... 370/252 |
| 6,658,565 B1 * | 12/2003 | Gupta et al. ................ 713/153 |
| 6,678,270 B1 * | 1/2004 | Garfinkel .................... 370/392 |
| 6,789,128 B1 * | 9/2004 | Harrison et al. ............ 709/246 |
| 6,944,168 B1 * | 9/2005 | Paatela et al. .............. 370/401 |

FOREIGN PATENT DOCUMENTS

| | | |
|---|---|---|
| JP | 1-259646 | 10/1989 |
| JP | 9-269930 | 10/1997 |
| JP | 10-313341 | 11/1998 |
| JP | 11-163940 | 6/1999 |
| JP | 2945938 | 7/1999 |
| JP | 11-313111 | 11/1999 |
| JP | 2000-83055 | 3/2000 |

OTHER PUBLICATIONS

Cheswick et al.;,"Firewalls", Japanese language edition published by SOFTBANK Corp., 1995, pp. 54-75.
Notification of Reasons for Rejection issued by Japanese Patent Office on Mar. 29, 2005, in Japanese application No. 2003-171283 and English translation of Notification.
Japanese Office Action for Patent Application No. 2000-249724, mailed Apr. 15, 2003 (with translation).

* cited by examiner

*Primary Examiner*—Seema S. Rao
*Assistant Examiner*—Donald L Mills
(74) *Attorney, Agent, or Firm*—Finnegan, Henderson, Farabow, Garrett & Dunner, L.L.P.

(57) ABSTRACT

A packet sending mechanism which has received a packet from a packet identifier adding mechanism sends the packet on the basis of preset information and determines whether the packet is related to an illicit access.

19 Claims, 13 Drawing Sheets

| TRANSMISSION DESTINATION IP ADDRESS | TRANSMISSION SOURCE IP ADDRESS | TRANSMISSION DESTINATION PROTOCOL | TRANSFER PERMISSION FLAG |
|---|---|---|---|
| 192.168.0.31 | 192.168.1.11 | HTTP | ENABLED |
| 192.168.0.31 | 192.168.1.12 | HTTP | ENABLED |
| 192.168.0.31 | 192.168.1.13 | HTTP | DISABLED |
| 192.168.0.31 | 192.168.1.14 | HTTP | DISABLED |
| 192.168.0.31 | 192.168.1.11 | SMTP | ENABLED |
| 192.168.0.31 | 192.168.1.12 | SMTP | DISABLED |
| 192.168.0.31 | 192.168.1.13 | SMTP | DISABLED |
| 192.168.0.31 | 192.168.1.14 | SMTP | ENABLED |
| 192.168.0.33 | ANY | HTTP | ENABLED |
| ANY | 192.168.1.15 | HTTP | DISABLED |
| ANY | 192.168.1.16 | SMTP | ENABLED |
F I G. 3 PRIOR ART
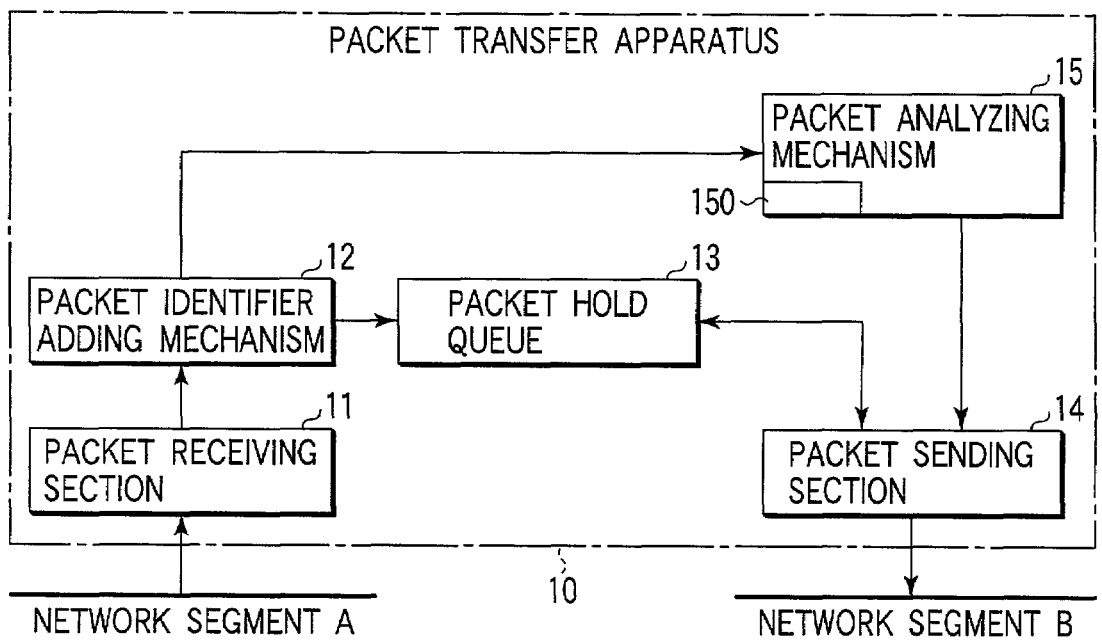
F I G. 4

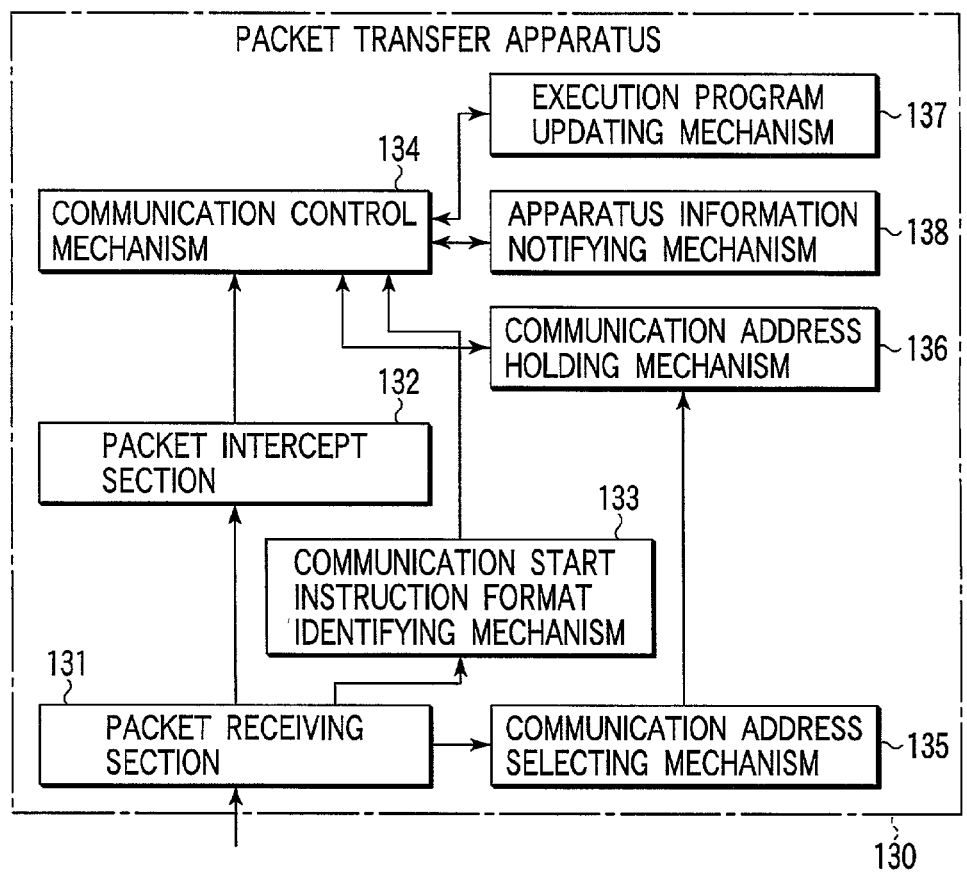
FIG. 22
FIG. 23
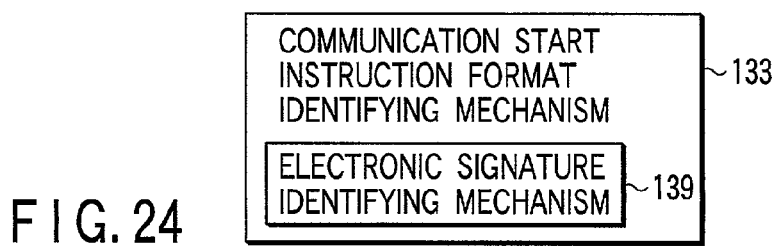
FIG. 24

METHODS AND SYSTEMS FOR TRANSFERRING PACKETS AND PREVENTING ILLICIT ACCESS

CROSS-REFERENCE TO RELATED APPLICATIONS

This application is based upon and claims the benefit of priority from the prior Japanese Patent Application No. 2000-249724, filed Aug. 21, 2000, the entire contents of which are incorporated herein by reference.

BACKGROUND OF THE INVENTION

The present invention relates to a packet transfer method and apparatus for transferring a packet between a plurality of network segments, and a storage medium which stores a program therefor.

In a conventional packet transfer apparatus connected between a plurality of network segments to transfer a packet between these segments, it is determined, to prevent any illicit access, whether a packet is to be transferred, on the basis of the network address, service number of the destination/transmission source, and the like which are set by the user using a network or another setting means.

The illicit access preventing means in the conventional packet transfer apparatus will be described with reference to FIGS. 1 through 3. FIG. 1 shows the arrangement of the conventional packet transfer apparatus. A packet transfer apparatus 01 has, as its components, a packet receiving section 02 for receiving a packet from a network segment as a transmission source, a packet filter section 03 for controlling to filter (select) the packet received by the packet receiving section 02, a packet sending section 04 for sending the packet that has passed through the packet filter section 03 to another network segment as a sending destination, a rule setting section 05 for setting the network address, service number of the destination/transmission source, or the like to prevent any illicit access, and a rule holding section 06 which holds information such as an address set by the rule setting section 05 and is looked up by the packet filter section 03.

FIG. 2 shows the arrangement of a network system including the packet transfer apparatus 01 having the above arrangement, and FIG. 3 shows contents stored in the rule holding section 06 of the packet transfer apparatus 01.

The user presets, e.g., destination/transmission source network address, service number, and identification information representing whether transmission is to be permitted in the rule holding section 06 using the function of the rule setting section 05.

Assume that a network system as shown in FIG. 2 is built using the packet transfer apparatus 01 having the arrangement shown in FIG. 1, and the user makes the rule holding section 06 hold in advance set contents (rules) as shown in FIG. 3 using the function of the rule setting section 05.

In this state, for example, assume that the packet receiving section 02 receives a packet which requests use of the HTTP service of a host having network address [192.168.0.31] from a host having network address [192.168.1.12].

The received packet is sent to the packet filter section 03.

The packet filter section 03 looks up the rules shown in FIG. 3, which are preset by the user and stored in the rule holding section 06.

The packet filter section 03 looks up the rules shown in FIG. 3, determines that an access from the host having network address [192.168.1.12] to use the HTTP service of the host having network address [192.168.0.31] is permitted, and sends the packet to the packet sending section 04. The packet is transferred from the packet sending section 04 to the host having network address [192.168.0.31], thus completing communication.

Instead, for example, assume that the packet receiving section 02 receives a packet which requests use of the HTTP service of the host having network address [192.168.0.31] from a host having network address [192.168.1.13]. The received packet is sent to the packet filter section 03.

The packet filter section 03 looks up the rules shown in FIG. 3, which are preset by the user and stored in the rule holding section 06.

The packet filter section 03 looks up the rules shown in FIG. 3 and determines that an access from the host having network address [192.168.1.13] to use the HTTP service of the host having network address [192.168.0.31] is inhibited. Hence, this packet is determined as an illicit access by the packet filter section 03 and discarded, so the received packet is not sent from the packet sending section 04.

A packet of another destination/transmission source/service is also sent/discarded in accordance with the contents (rules) in the rule holding section 06 shown in FIG. 3 in the same way as described above.

The illicit access preventing means in the conventional packet transfer apparatus described above cannot prevent an illicit access using an address or service number which is set to transfer the packet only by determining whether the packet is to be transferred on the basis of, e.g., the MAC (Media Access Control) address of the destination/transmission source, the destination/transmission source address or service number of an upper protocol, and is insufficient for the purpose of preventing a packet related to an illicit access from passing.

For example, even when all the destination/transmission source MAC addresses or the destination/transmission source addresses or service numbers of upper protocols are correctly set, a packet having data that is regarded as an illicit access is transferred through (via) the set transmission source, and the data carried by the packet cause an operation error of an application or the like of the receiving-side system, resulting in a problem of reliability.

In addition, the setting of the destination/transmission source MAC address, the destination/transmission source address or service number of an upper protocol, or the like, which is used to determine whether a packet is to be transferred, changes depending on a user or installation place, and setting must be done as a packet transfer apparatus is installed. However, this setting is difficult, so setting errors often occur to allow an illicit access.

Furthermore, a network address such as an IP address is necessary for setting through a network, and this can be an illicit access target.

Even when a packet which is determined not to be transferred in accordance with, e.g., destination/transmission source MAC address, the destination/transmission source address or service number of an upper protocol has arrived, it is not always an illicit access. Hence, even when it is by some way that a packet that is determined not to be transferred has arrived, it does not indicate that an illicit access is being made.

As described above, the illicit access preventing means in the conventional packet transfer apparatus cannot prevent an illicit access using an address or service number which is set to transfer the packet only by determining whether the packet is to be transferred on the basis of, e.g., the MAC address of the destination/transmission source, the destination/transmission source address or service number of an upper protocol, and is insufficient for the purpose of preventing a packet related to an illicit access from passing.

In addition, the setting of the destination/transmission source MAC address, the destination/transmission source address, service number of an upper protocol, or the like, which is used to determine whether a packet is to be transferred, changes depending on a user or installation place, and setting must be done as a packet transfer apparatus is installed. However, this setting is difficult, so setting errors often occur to allow an illicit access.

Furthermore, a network address such as an IP address is necessary for setting through a network, and this can be an illicit access target.

Even when a packet which is determined not to be transferred in accordance with, e.g., destination/transmission source MAC address, the destination/transmission source address or service number of an upper protocol has arrived, it is not always an illicit access. Hence, even when it is by some way that a packet that is determined not to be transferred has arrived, it does not indicate that an illicit access is being made.

As described above, the conventional packet transfer apparatus has various problems of reliability related to illicit access prevention and large operation load on the user.

BRIEF SUMMARY OF THE INVENTION

It is an object of the present invention to provide a packet transfer apparatus and method capable of implementing a reliable illicit access preventing function without any large operation load on the user, and a storage medium which stores a program therefor.

It is another object of the present invention to provide a packet transfer apparatus and method capable of implementing a reliable illicit access preventing function, which can reliably prevent transfer of a packet related to an illicit access by having a function of analyzing the contents of a packet (received packet) transferred from a transmission source and determining that the packet is not related to an illicit access, and a storage medium which stores a program therefor.

It is still another object of the present invention to provide a packet transfer apparatus and method capable of easily installing, e.g., a packet transfer mechanism for preventing passage of a packet related to an illicit access that cannot be prevented only by determining whether the received packet is to be transferred, on the basis of destination/transmission source MAC address, the destination/transmission source address or service number of an upper protocol, or the like, a packet transfer mechanism for preventing passage of a packet related to an illicit access without user's setting to determine whether the packet is to be transferred, a packet transfer mechanism capable of preventing itself from becoming an illicit access target, and a packet transfer mechanism capable of displaying that an illicit access is being made, and a storage medium which stores a program therefor.

In order to achieve the above objects, according to the present invention, there is provided a packet transfer apparatus which is arranged between a plurality of network segments and monitors a packet to be transferred between the network segments, characterized by comprising packet analyzing means for, in sending a received packet received through a first network segment to a second network segment, analyzing on the basis of a preset condition whether information of the received packet contains a factor for causing an operation error in software of a device connected to the second network segment, and means for, when the analyzing means determines that the received packet is an illicit packet having information containing the factor for the operation error, discarding the illicit packet and sending only a received packet determined as a normal packet to the second network segment.

According to the present invention, there is also provided a packet transfer apparatus which is connected to at least first and second network segments and, when packets to be transferred between the first and second network segments include a packet for causing an illicit access, excludes the illicit packet, characterized by comprising receiving means for receiving a packet from the first network segment, identifier adding means for adding an identifier to the received packet received by the receiving means, a packet hold queue for temporarily holding the received packet having the added identifier, packet analyzing means for determining whether the received packet is a packet related to an illicit access including a known preset operation error condition, and upon determining that the received packet is not the packet related to the illicit access, outputting the identifier of the received packet, and sending means for receiving the identifier output from the packet analyzing means, extracting the received packet having the received identifier from the packet hold queue, and sending the received packet to the second network segment.

According to the present invention, there is also provided a packet transfer apparatus which is connected to at least three network segments and, when packets to be transferred between the plurality of network segments include a packet for causing an illicit access, excludes the illicit packet, characterized by comprising receiving means for receiving a packet from the network segment, identifier adding means for adding an identifier to the received packet received by the receiving means, a packet hold queue for temporarily holding the received packet having the added identifier, packet analyzing means for determining whether the received packet is a packet related to an illicit access including a known preset operation error condition, and upon determining that the received packet is not the packet related to the illicit access, outputting the identifier of the received packet, sending segment determining means for receiving the identifier output from the packet analyzing means, extracting the received packet having the received identifier from the packet hold queue, and determining a network segment to which the received packet should be sent from a destination MAC address contained in the received packet, and one or a plurality of sending means for sending the received packet to the network segment determined by the sending segment determining means.

According to the present invention, there is provided a packet transfer apparatus which is connected to at least three network segments and, when packets to be transferred between the plurality of network segments include a packet for causing an illicit access, excludes the illicit packet, characterized by comprising receiving means for receiving a packet from the network segment, identifier adding means for adding an identifier to the received packet received by the receiving means, a plurality of packet hold queues for temporarily holding the received packet having the added identifier on each network segment as sending destinations, sending segment determining means for determining a sending destination network segment of the received packet from a destination MAC address contained in the received packet having the added identifier and sending the packet having the added identifier to the packet hold queue corresponding to the network segment, packet analyzing means for determining whether the received packet is a packet related to an illicit access including a known preset operation error condition, and upon determining that the received packet is not the packet related to the illicit access, outputting the identifier of the received packet, and a plurality of sending means, arranged in correspondence with the packet hold queues, for receiving the identifier output from the packet analyzing means, extracting the received packet from one or the plurality of packet hold queues which hold the received packet having the identifier, and sending the received packet to the corresponding network segment.

The apparatus of the present invention is characterized by comprising a database which stores a character string contained in a packet related to an illicit access received in the past.

The apparatus of the present invention is characterized by further comprising illicit access log holding means for, when the packet analyzing means determines that the received packet is the packet related to the illicit access, acquiring and holding detailed information containing at least one of a presence, structure, format, receiving time, and transmission source of the illicit packet, and illicit access log display means for displaying an illicit access log held by the illicit access log holding means.

The apparatus of the present invention is characterized by further comprising sent packet holding means for holding a sent packet for which the packet analyzing means determines that the packet is not the packet related to the illicit access, wherein in analyzing the illicit packet, the packet analyzing means looks up the sent packet held by the sent packet holding means.

The apparatus of the present invention is characterized in that it is determined whether the received packet is the packet related to the illicit access by at least one of means for determining whether an option or a parameter combination in a header field of the received packet satisfies a preset known condition, means for determining whether a length of data carried by the received packet or a combination of parameters designated by the data satisfies a preset known condition, and means for determining whether a data structure or data contents of packets satisfy the preset known condition.

The apparatus of the present invention is characterized by further comprising packet storage means for storing the received packet having the added identifier, program storage means for storing a packet analysis program which includes a character string contained in the packet related to the illicit access, and program executing means for determining on the basis of the result of the execution of the packet analysis program whether the received packet stored in the packet storage means is the packet related to the illicit access containing the known operation error condition, and upon determining that the received packet is not the packet related to the illicit access, outputting the identifier of the received packet.

The apparatus of the present invention is characterized by further comprising analysis program updating means for updating the packet analysis program stored in the program storage means.

The apparatus of the present invention is characterized in that the packet transfer apparatus further comprises a communication interface formed from a serial interface or a network interface, and analysis program update instruction format identifying means for identifying that data received through the communication interface satisfies a specific format representing an analysis program update instruction, and loads or updates the packet analysis program on the basis of the data identified as the analysis program update instruction by the analysis program update instruction format identifying means.

The apparatus of the present invention is characterized by further comprising analysis program update instruction format identifying means for identifying that a packet received by the receiving means is data which satisfies a specific format representing an analysis program update instruction and the analysis program update instruction format identifying means loading or updating the packet analysis program on the basis of the data of the received packet identified as the analysis program update instruction.

The apparatus of the present invention is characterized in that electronic signature information is extracted from data in the packet, data input through the serial interface, or data input through the network interface, it is determined whether the electronic signature information is a valid signature, and upon determining that the electronic signature information is the valid signature, the packet analysis program is loaded or updated.

The apparatus of the present invention is characterized by further comprising apparatus information notifying means for, when the packet analyzing means determines that the received packet is the packet related to the illicit access, notifying another device of detailed information containing at least one of a presence, structure, format, receiving time, and transmission source of the illicit packet.

The apparatus of the present invention is characterized by further comprising communication address setting means for presetting a transmission source address used for only specific communication as communication for setting or updating the packet analysis program or communication with which another device is notified of the detailed information of the illicit packet, communication address holding means for holding the communication address set by the communication address setting means, and communication control means for, when the specific communication is not to be performed, discarding a packet sent to the transmission source address, and only when the specific communication is to be performed, receiving the packet for the transmission source address.

The apparatus of the present invention is characterized by further comprising communication address selecting means for selecting one of transmission source addresses of packets received in the past from a network segment different from a sending destination network segment of specific communication as a transmission source address used for only the specific communication as communication for setting or updating the packet analysis program or communication with which another device is notified of the detailed information of the illicit packet, and packet intercept means for intercepting a packet related to the specific communication from packets for the transmission source address selected by the communication address selecting means.

The apparatus of the present invention is characterized by further comprising communication start instruction format identifying means for identifying that a packet as a transfer target is data which satisfies a specific format representing a start instruction for the specific communication and starting the specific communication.

The apparatus of the present invention is characterized in that the communication start instruction format identifying means comprises electronic signature identifying means for determining whether electronic signature contained in the data is a valid signature and only upon determining that the electronic signature is the valid signature, identifying that the data is a communication start instruction.

In order to achieve the above objects, according to the present invention, there is provided a packet transfer method for a packet transfer apparatus which is arranged between a plurality of network segments and monitors a packet to be transferred between the network segments, characterized by comprising the steps of, in sending a received packet received from a first network segment to a second network segment, determining on the basis of a preset condition whether information of the received packet contains a factor for causing an operation error in software of a device connected to the second network segment, and when it is determined that the received packet is an illicit packet having information containing the factor for the operation error, discarding the illicit packet and sending only a received packet determined as a normal packet to the second network segment.

According to the present invention, there is also provided a packet transfer method for a packet transfer apparatus which is connected to at least first and second network segments and, when packets to be transferred between the first and second network segments include a packet for causing an illicit access, excludes the illicit packet, characterized by comprising the steps of receiving a packet from the first network segment, adding an identifier to the received packet, temporarily holding the received packet having the added identifier, analyzing the received packet having the added identifier, determining that the received packet is not a packet related to an illicit access, and outputting the identifier of the received packet determined as a normal packet, and receiving the identifier, extracting the received packet having the received identifier from the received packets temporarily held, and sending the received packet to the second network segment.

According to the present invention, there is also provided a packet transfer method for a packet transfer apparatus which is connected to at least three network segments and, when packets to be transferred between the plurality of network segments include a packet for causing an illicit access, excludes the illicit packet, characterized by comprising the steps of receiving a packet from the network segment, adding an identifier to the received packet received, temporarily holding the received packet having the added identifier, analyzing the received packet having the added identifier, determining that the received packet is not a packet related to an illicit access, and outputting the identifier of the received packet determined as a normal packet, receiving the identifier, extracting the received packet having the received identifier from the received packets temporarily held, and determining a network segment to which the received packet should be sent from a MAC address contained in the received packet, and sending the received packet extracted to the determined network segment.

According to the present invention, there is also provided a packet transfer method for a packet transfer apparatus which is connected to at least three network segments and, when packets to be transferred between the plurality of network segments include a packet for causing an illicit access, excludes the illicit packet, characterized by comprising the steps of receiving a packet from one of the network segments, adding an identifier to the received packet received, determining a sending destination network segment of the received packet from a destination MAC address contained in the received packet having the added identifier and storing, in accordance with the determination, the received packet in packet hold queues arranged on each network segment as sending destinations, analyzing the received packet having the added identifier, determining that the received packet is not a packet related to an illicit access, and outputting the identifier of the received packet determined as a normal packet, and receiving the identifier, extracting the received packet having the received identifier from the received packets in the packet hold queues, and sending the received packet to the corresponding network segment.

In order to achieve the above objects, according to the present invention, there is provided a computer-readable storage medium which stores a program stored in a packet transfer apparatus for monitoring a packet to be transferred between at least two network segments to implement a function of receiving a packet from one of the network segments, a function of adding an identifier to the received packet received, a function of temporarily holding the received packet having the added identifier, a function of analyzing the received packet having the added identifier and, upon determining that the received packet is not a packet related to an illicit access, outputting the identifier of the received packet, and a function of receiving the identifier, extracting the received packet having the identifier from packets temporarily held, and sending the received packet to the other network segment at a sending destination.

According to the present invention, there is also provided a storage medium which stores a program stored in a packet transfer apparatus for monitoring a packet to be transferred between at least three network segments to implement a function of receiving a packet from one of the network segments, a function of adding an identifier to the received packet received, a function of temporarily holding the received packet having the added identifier, a function of analyzing the received packet having the added identifier and, upon determining that the received packet is not a packet related to an illicit access, outputting the identifier of the received packet, a function of receiving the identifier, extracting the received packet having the identifier from received packets temporarily held, and determining a network segment to which the received packet should be sent from a MAC address contained in the received packet, and a function of sending the received packet to the determined network segment.

According to the present invention, there is also provided a storage medium which stores a program stored in a packet transfer apparatus for monitoring a packet to be transferred between at least three network segments to implement a function of receiving a packet from one of the network segments, a function of adding an identifier to the received packet received, a function of determining a network segment to which the received packet should be sent from a MAC address contained in the received packet having the added identifier, a function of temporarily holding the received packet having the added identifier on each determined sending destination network segment, a function of analyzing the received packet having the added identifier, and upon determining that the received packet is not a packet related to an illicit access, outputting the identifier of the received packet, and a function of receiving the identifier, extracting the received packet having the received identifier from the received packets temporarily held, and sending the received packet to the corresponding network segment.

With the above function of excluding a packet related to an illicit access, there can be implemented a packet transfer apparatus which is connected to a plurality of network segments to transfer a packet between the segments and is capable of preventing passage of a packet related to an illicit access that cannot be prevented only by determining whether a packet is to be transferred, on the basis of, e.g., destination/transmission source MAC address, the destination/transmission source address or service number of an upper protocol.

In addition, a packet transfer apparatus for preventing passage of a packet related to an illicit access without user's setting to determine whether the packet is to be transferred can be implemented.

Furthermore, a packet transfer apparatus capable of preventing passage of a packet related to an illicit access and preventing itself from becoming an illicit access target because of the absence of a network address such as an IP address can be implemented.

Also, a packet transfer apparatus capable of displaying that an illicit access is being made can be implemented.

According to the present invention, a reliable illicit access preventing function can be implemented without increasing the operation load on the user.

According to the present invention, since a function of determining that a packet is not a packet related to an illicit access by sending the contents of the packet transferred from the transmission source is arranged, a reliably illicit access preventing function capable of reliably preventing transfer of a packet related to an illicit access can be implemented. More specifically, according to the present invention, a packet transfer apparatus which prevents passage of a packet related to an illicit access that cannot be prevented only by determining whether a packet is to be transferred, on the basis of, e.g., destination/transmission source MAC address, the destination/transmission source address or service number of an upper protocol can be implemented. In addition, a packet transfer apparatus for preventing passage of a packet related to an illicit access without user's setting to determine whether the packet is to be transferred can be implemented. Furthermore, a packet transfer apparatus capable of preventing passage of a packet related to an illicit access and preventing itself from becoming an illicit access target because of the absence of a network address such as an IP address can be implemented. Also, a packet transfer apparatus capable of displaying that an illicit access is being made can be implemented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view showing an example of contents stored in the rule holding section of the conventional packet transfer apparatus shown in FIG. 2;

FIG. 4 is a block diagram showing the components of the main part of a packet transfer apparatus according to the first embodiment of the present invention;

FIG. 22 is a view showing an example of the structure of an address/segment correspondence table in the 12th embodiment;

FIG. 23 is a block diagram showing the components of the main part of a packet transfer apparatus according to the 13th embodiment of the present invention; and FIG. 24 is a block diagram showing another arrangement of a communication start identifying mechanism in the 13th embodiment.

DETAILED DESCRIPTION OF THE INVENTION

Figure 1:
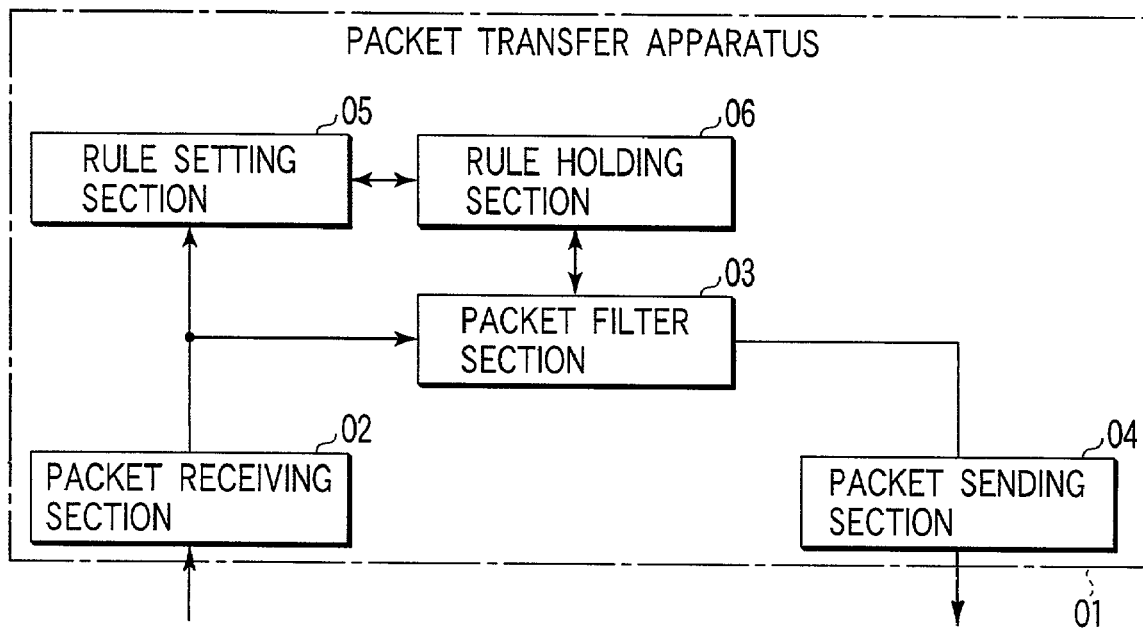
FIG. 1 is a block diagram showing the arrangement of a conventional packet transfer apparatus.

The embodiments of the present invention will be described below with reference to the accompanying drawing.

The first embodiment of the present invention will be described first with reference to FIG. 4.

FIG. 4 is a block diagram showing the components of the main part of a packet transfer apparatus according to the first embodiment of the present invention. The first embodiment shown in FIG. 4 exemplifies one side of an arrangement having a function of preventing passage of a packet related to an illicit access for simplicity.

In a packet transfer apparatus 10 shown in FIG. 4, a packet receiving section 11 and packet sending section 14 are connected between different network segments (segment A–segment B). In the example shown here, a packet is transferred from the network segment A to which the packet receiving section 11 is connected to the network segment B to which the packet sending section 14 is connected.

The packet receiving section 11 receives a packet on the network segment A. A packet identifier adding mechanism 12 adds an identifier to the received packet. The packet hold queue 13 temporarily holds the packet with the identifier until a packet analyzing mechanism 15 determines that the packet is not related to an illicit access. The packet analyzing mechanism 15 receives a packet from the packet identifier adding mechanism 12 and notifies the packet sending section 14 of the identifier of a packet which is determined as a packet not related to an illicit access. The packet sending section 14 extracts a received packet having the same identifier as that received from the packet analyzing mechanism 15 from the packet hold queue 13 and sends the packet to the network segment B.

The operation of the first embodiment of the present invention will be described with reference to FIG. 4.

In the packet transfer apparatus 10 shown in FIG. 4, the packet receiving section 11 sequentially receives packets transmitted from the transmitting-side system (or terminal or apparatus) connected to the network segment A.

The packet identifier adding mechanism 12 adds identifiers unique in the apparatus to the received packets. As the identifiers, serial numbers 1, 2, 3, 4, . . . can be added. Alternatively, packet arrival times or addresses in a storage device at which the packets are stored may be used.

A packet having an identifier added by the packet identifier adding mechanism 12 is stored in the packet hold queue 13 and also transferred to the packet analyzing mechanism 15.

The packet analyzing mechanism 15 has a database 150 in which determination information for identifying a packet related to an illicit access is stored in advance. The database 150 stores at least character strings (determination information) contained in packets related to illicit accesses.

The packet analyzing mechanism 15 which has received the received packet from the packet identifier adding mechanism 12 determines on the basis of the determination information stored in the database 150 whether the received packet is related to an illicit access. The database 150 stores the list of character strings contained in packets related to illicit accesses as determination information. The packet analyzing mechanism 15 compares the received packet with each of the character strings contained in the character string list stored in the database 150. If one of the character strings included in the character string list is contained in the received packet, it can be determined that the received packet is related to an illicit access. If it is determined that the received packet is not a packet related to an illicit access, the packet analyzing mechanism 15 notifies the packet sending section 14 of the identifier added to that received packet.

Upon receiving the identifier, the packet sending section 14 extracts the received packet having the identifier from the packet hold queue 13 and sends the packet to the receiving-side system (or a terminal or apparatus) through the network segment B.

A received packet determined by the packet analyzing mechanism 15 as a packet related to an illicit access is left in the packet hold queue 13 and discarded by an explicit instruction or an implicit means such as overflow from the packet hold queue 13.

The series of operations implement a packet transfer apparatus which prevents a packet related to an illicit access from passing.

Determination information for identifying a packet related to an illicit access, which is stored in the database 150 of the packet analyzing mechanism 15, can contain information related to the contents of packet data. For this reason, a packet transfer apparatus which prevents passage of a packet related to an illicit access that cannot be prevented only by determining whether the packet is to be transferred, on the basis of, e.g., destination/transmission source MAC address, the destination/transmission source address or service number of an upper protocol can be implemented.

As determination information for identifying a packet related to an illicit access, which is stored in the database 150 of the packet analyzing mechanism 15 in advance, the same information can be used independently of the user or installation place. For this reason, a packet transfer apparatus 10 for preventing passage of a packet related to an illicit access without user's setting to determine whether the packet is to be transferred can be implemented.

The packet transfer apparatus 10 itself need not have a network address such as an IP address for operation. Hence, a packet transfer apparatus which prevents itself from becoming an illicit access target and prevents a packet related to an illicit access from passing can be implemented. Furthermore, since the contents of packet data can also be used as information for identifying a packet related to an illicit access, a packet which is obviously a packet related to an illicit access can be determined. For example, a packet which sends, to an application program, a character string that is abnormally longer than a defined length can be determined as a packet obviously related to an illicit access. When a specific data string is known to cause an operation error in an application program or OS operation, a packet containing the specific data string can also be determined as a packet obviously related to an illicit access. A packet transfer apparatus capable of displaying that an illicit access is being or has been done by displaying it for the user when such a packet which can be determined as a packet obviously related to an illicit access is sent can be implemented.

The second embodiment of the present invention will be described next with reference to FIG. 5.

Figure 5:
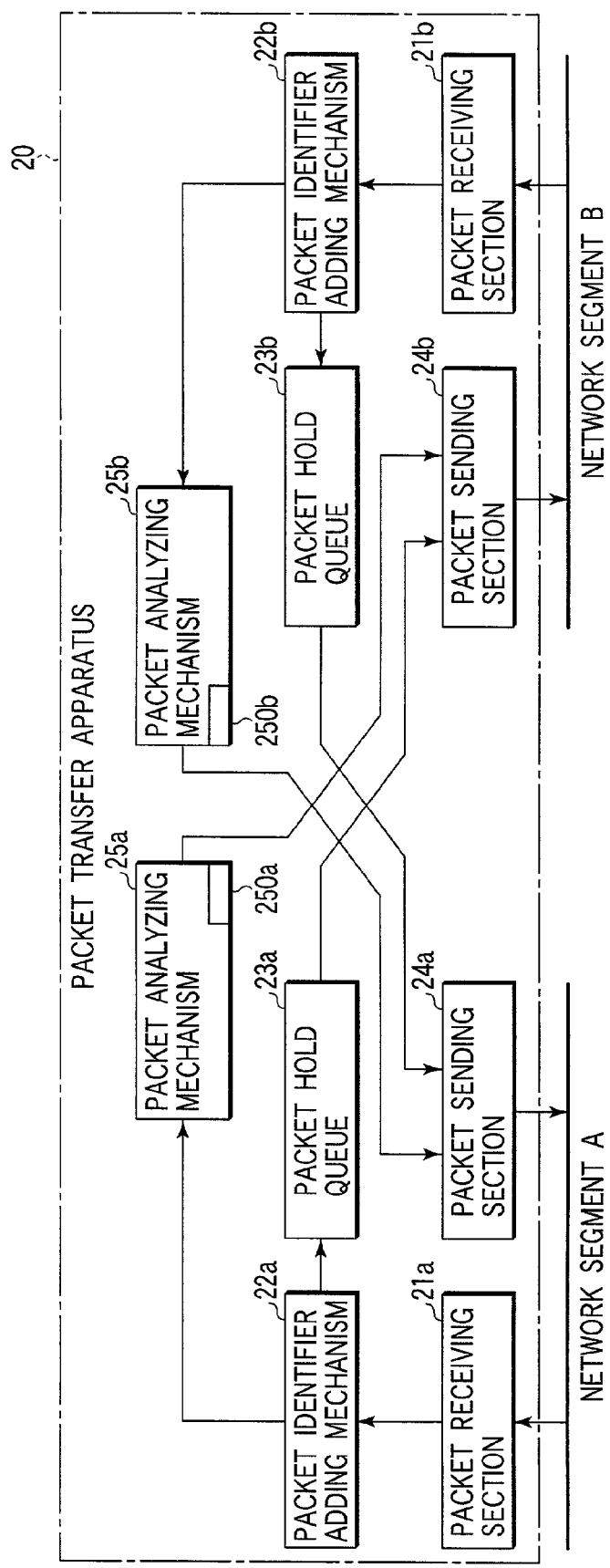
FIG. 5 is a block diagram showing the components of the main part of a packet transfer apparatus according to the second embodiment of the present invention.

FIG. 5 is a block diagram showing the components of the main part of a packet transfer apparatus according to the second embodiment of the present invention.

The second embodiment of the present invention exemplifies an arrangement having a function of preventing passage of a packet related to an illicit access for bidirectional transfer in the packet transfer apparatus.

A packet transfer apparatus 20 shown in FIG. 5 can prevent passage of a packet related to an illicit access from a network segment A to a network segment B and also prevent passage of a packet related to an illicit access from the network segment B to the network segment A.

More specifically, in the packet transfer apparatus 20, a packet receiving section 21*a* receives a packet from the network segment A.

A packet identifier adding mechanism 22*a* adds an identifier unique in the apparatus to the received packet.

The received packet having an identifier added by the packet identifier adding mechanism 22*a* is stored in a packet hold queue 23*a* and also transferred to a packet analyzing mechanism 25*a*. A database 250*a* of the packet analyzing mechanism 25*a* stores determination information for identifying a packet related to an illicit access in advance.

The packet analyzing mechanism 25*a* which has received the packet from the packet identifier adding mechanism 22*a* analyzes the received packet on the basis of the determination information stored in the database 250*a* and determines whether the received packet is related to an illicit access. If it is determined that the received packet is not a packet related to an illicit access, the packet analyzing mechanism 25*a* notifies a packet sending section 24*b* of the identifier added to the received packet. Upon receiving the identifier, the packet sending section 24*b* extracts the received packet having the identifier from the packet hold queue 23*a* and sends the packet to the network segment B.

A received packet determined by the packet analyzing mechanism 25*a* as a packet related to an illicit access is left in the packet hold queue 23*a* and discarded by an explicit instruction or an implicit means such as overflow from the packet hold queue 23*a*.

On the other hand, a packet receiving section 21*b* receives a packet from the network segment B. A packet identifier adding mechanism 22*b* adds an identifier unique in the apparatus to the received packet.

The received packet having an identifier added by the packet identifier adding mechanism 22*b* is stored in a packet hold queue 23*b* and also transferred to a packet analyzing mechanism 25*b*. A database 250*b* of the packet analyzing mechanism 25*b* stores determination information for identifying a packet related to an illicit access in advance.

The packet analyzing mechanism 25*b* which has received the received packet from the packet identifier adding mechanism 22*b* analyzes the received packet on the basis of the determination information stored in the database 250*b* and determines whether the received packet is related to an illicit access. If it is determined that the received packet is not a packet related to an illicit access, the packet analyzing mechanism 25*b* notifies a packet sending section 24*a* of the identifier added to the received packet.

The packet sending section 24*a* which is notified of the identifier extracts the received packet having the identifier from the packet hold queue 23*b* and sends the packet to the network segment A.

A received packet determined by the packet analyzing mechanism 25*b* as a packet related to an illicit access is left in the packet hold queue 23*b* and discarded by an explicit instruction or an implicit means such as overflow from the packet hold queue 23*b*.

With these operations, a packet transfer apparatus which prevents passage of an illicit access for both of packet transfer from the network segment A to the network segment B and packet transfer from the network segment B to the network segment A can be implemented.

The third embodiment of the present invention will be described next with reference to FIG. 6.

Figure 6:
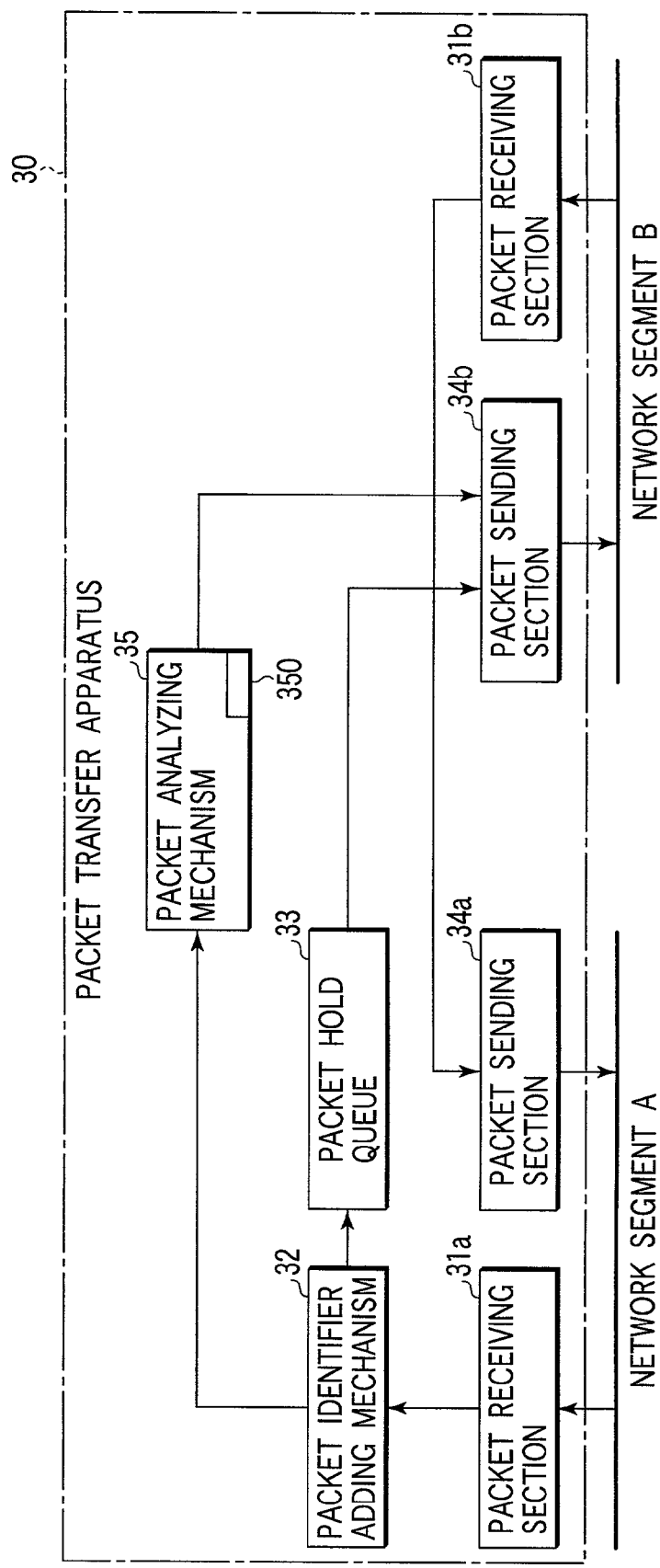
FIG. 6 is a block diagram showing the components of the main part of a packet transfer apparatus according to the third embodiment of the present invention.

FIG. 6 is a block diagram showing the components of the main part of a packet transfer apparatus according to the third embodiment of the present invention.

The third embodiment shown in FIG. 6 exemplifies an arrangement having a function of preventing passage of a packet related to an illicit access for one-way transfer in the packet transfer apparatus.

A packet transfer apparatus 30 shown in FIG. 6 simplifies the arrangement of the second embodiment shown in FIG. 5. This apparatus prevents passage of a packet related to an illicit access from a network segment A to a network segment B but cannot prevent passage of the packet for packet transfer from the network segment B to the network segment A. The packet transfer apparatus 30 shown in FIG. 6 can have an arrangement simpler than that of the packet transfer apparatus 20 of the second embodiment shown in FIG. 5 when the packet transfer apparatus is arranged at the connection point to an external network (for example, when a system connected to the network segment B is a private network system capable of self management, and the network segment A is an external network system).

In the packet transfer apparatus 30, a packet receiving section 31*a* receives a packet from the network segment A. A packet identifier adding mechanism 32 adds an identifier unique in the apparatus to the received packet from the packet receiving section 31*a*.

The received packet having an identifier added by the packet identifier adding mechanism 32 is stored in a packet hold queue 33 and also transferred to a packet analyzing mechanism 35. A database 350 of the packet analyzing mechanism 35 stores determination information for identifying a packet related to an illicit access in advance.

The packet analyzing mechanism 35 which has received the received packet from the packet identifier adding mechanism 32 analyzes the received packet on the basis of the determination information stored in the database 350 and determines whether the received packet is related to an illicit access. If it is determined that the received packet is not a packet related to an illicit access, the packet analyzing mechanism 35 notifies a packet sending section 34*b* of the identifier added to the received packet.

The packet sending section 34*b* which is notified of the identifier extracts the received packet having the identifier from the packet hold queue 33 and sends the packet to the network segment B.

A received packet determined by the packet analyzing mechanism 35 as a packet related to an illicit access is left in the packet hold queue 33 and discarded by an explicit instruction or an implicit means such as overflow from the packet hold queue 33.

On the other hand, a packet receiving section 31*b* receives a packet from the network segment B and transfers the packet to a packet sending section 34*a* directly (in the through mode). The packet sending section 34*a* sends the packet received from the packet receiving section 31*b* to the network segment A.

With these operations, a packet transfer apparatus in which packet transfer from the network segment A to the network segment B is strictly managed such that no packet related to an illicit access is passed, and the preventing function related to an illicit access is simplified for transfer in the opposite direction can be implemented.

The fourth and fifth embodiments will be described next with reference to the FIGS. 7 and 8.

Figure 7:
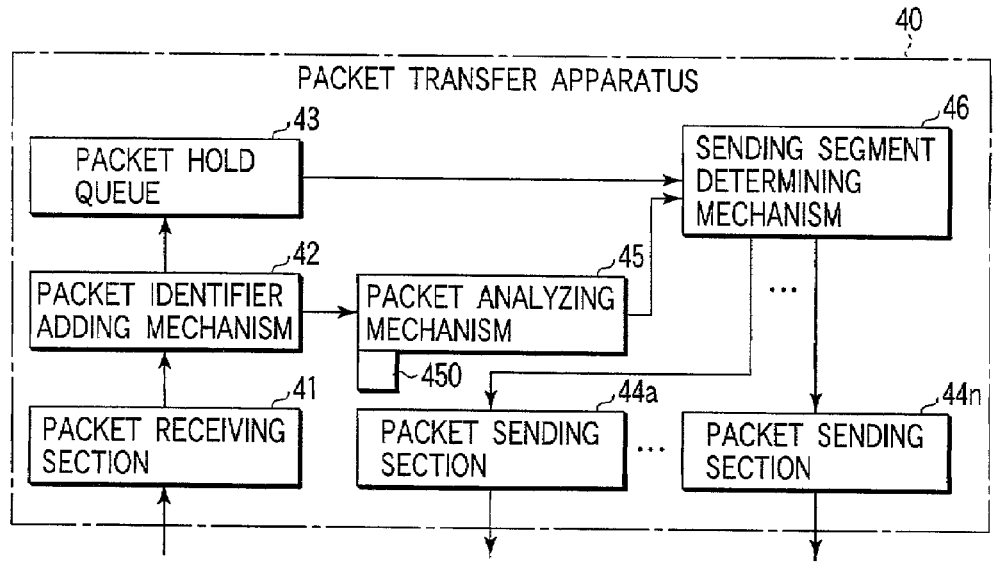
FIG. 7 is a block diagram showing the components of the main part of a packet transfer apparatus according to the fourth embodiment of the present invention.

FIG. 7 is a block diagram showing the components of the main part of a packet transfer apparatus according to the fourth embodiment of the present invention. FIG. 8 is a block diagram showing the components of the main part of a packet transfer apparatus according to the fifth embodiment of the present invention.

Figure 8:
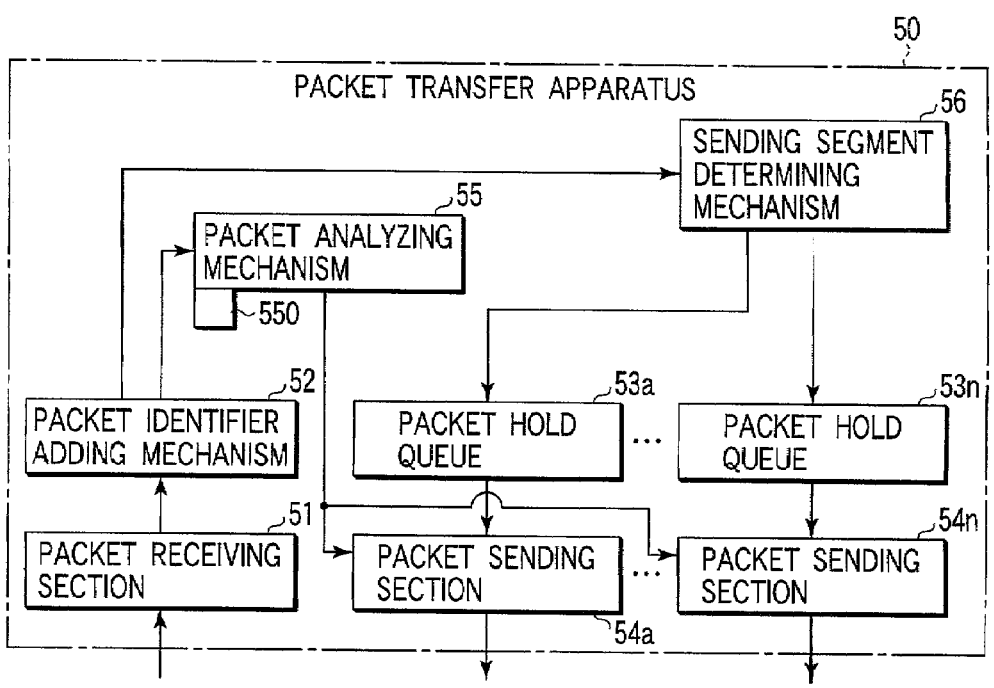
FIG. 8 is a block diagram showing the components of the main part of a packet transfer apparatus according to the fifth embodiment of the present invention.

In the embodiments shown in FIGS. 7 and 8, when a network segment to which a packet should be sent can be determined, the packet is sent to only the determined network segment, thereby reducing traffic in network segments other than the determined network segment.

When the packet transfer apparatus of the present invention is to transfer a packet between three or more network segments, a packet received from a given network segment may be sent to all network segments except that network segment. Alternatively, when a network segment to which the packet should be sent can be determined from the destination MAC address of the packet, the packet may be sent to only the determined network segment to reduce traffic in network segments other than the determined network segment.

In the fourth embodiment shown in FIG. 7, the arrangement of a packet transfer apparatus 40 using a packet hold queue common to sending segments is shown. In this case, after it is determined by a packet analyzing mechanism 45 whether a packet is related to an illicit access, the network segment to which the packet should be sent is determined.

In the packet transfer apparatus 40 having the arrangement shown in FIG. 7, a received packet received by a packet receiving section 41 and having an identifier added by a packet identifier adding mechanism 42 is stored in a packet hold queue 43 common to all sending segments.

The packet analyzing mechanism 45 determines on the basis of determination information stored in a database 450 whether the received packet is related to an illicit access. If it is determined that the packet is not a packet related to an illicit access, a sending segment determining mechanism 46 is notified of the identifier of the received packet.

The sending segment determining mechanism 46 which is notified of the identifier by the packet analyzing mechanism 45 extracts the received packet having the identifier from the packet hold queue 43 and determines the network segment to which the packet should be sent from the destination MAC address of the received packet. When the network segment can be determined, the received packet is transferred to at least one packet sending section (one of packet sending sections 44a through 44n) corresponding to the determined network segment. The packet sending section sends the received packet to the identified network segment. When the network segment cannot be identified (in case of broadcast), the received packet is sent to all the packet sending sections 44a through 44n, so the received packet is sent to network segments connected to the packet sending sections 44a through 44n.

In the fifth embodiment shown in FIG. 8, the arrangement of a packet transfer apparatus 50 having packet hold queues individually in each of sending network segments is shown. In this case, the network segment to which a packet should be sent is determined before a packet analyzing mechanism 55 determines whether a received packet is a packet related to an illicit access.

Referring to FIG. 8, a packet received by a packet receiving section 51 and having an identifier added by a packet identifier adding mechanism 52 is transferred to a sending segment determining mechanism 56 and packet analyzing mechanism 55.

The sending segment determining mechanism 56 determines the network segment to which the packet should be sent on the basis of the destination MAC address of the received packet received by the packet receiving section 51 and having an identifier added by the packet identifier adding mechanism 52, and stores the received packet in a packet hold queue (one of packet hold queues 53a through 53n) corresponding to the identified network segment.

Each of the packet hold queues 53a through 53n temporarily holds a received packet stored by the sending segment determining mechanism 56 until the packet analyzing mechanism 55 determines that the packet is not a packet related to an illicit access. Packet sending sections 54a through 54n are connected in correspondence with the packet hold queues 53a through 53n, respectively.

The packet analyzing mechanism 55 determines on the basis of determination information stored in a database 550 whether the received packet is related to an illicit access. If it is determined that the received packet is not a packet related to an illicit access, the packet sending sections 54a through 54n are notified of the identifier of the received packet.

When the received packet having the identifier is present in one of the packet hold queues 53a through 53n connected in correspondence with the packet sending sections 54a through 54n, the corresponding one of the packet sending sections 54a through 54n which are notified of the identifier extracts the received packet and sends it to a corresponding network segment.

If the network segment to which the packet should be sent cannot be recognized, the sending segment determining mechanism 56 stores the received packet in all the packet hold queues 53a through 53n. When the packet analyzing mechanism 55 determines that the received packet is not an illicit access, and the packet sending sections 54a through 54n are notified of the identifier of the received packet, the packet sending sections 54a through 54n extract the received packet from the packet hold queues 53a through 53n and send the received packet to all corresponding network segments.

With this arrangement, the time after the packet analyzing mechanism 55 determines that the packet is not a packet related to an illicit access until the packet is sent to the packet sending section (54a through 54n) can be shortened.

According to the above-described fourth and fifth embodiments, when the network segment to which a packet should be sent can be identified, the packet is sent to only the identified network segment, thereby reducing traffic in network segments except the identified network segment.

The sixth embodiment of the present invention will be described next with reference to FIGS. 9 through 11.

Figure 9:
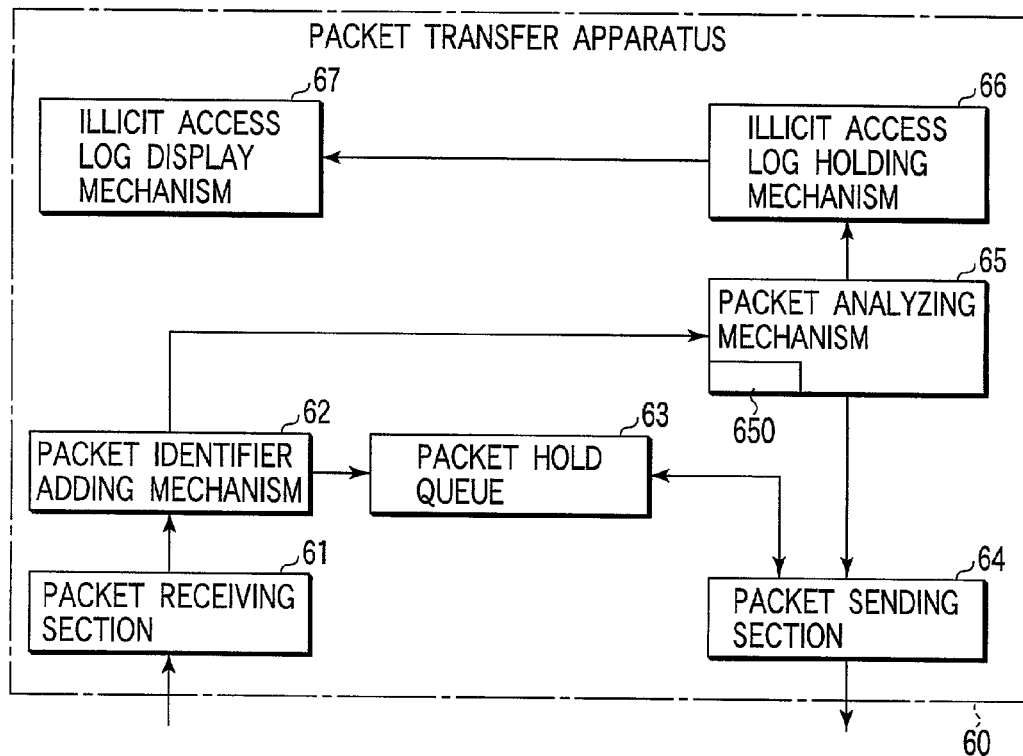
FIG. 9 is a block diagram showing the components of the main part of a packet transfer apparatus according to the sixth embodiment of the present invention.

FIG. 9 is a block diagram showing the components of the main part of a packet transfer apparatus according to the sixth embodiment of the present invention. FIGS. 10 and 11 are views showing examples of the illicit access display means in the sixth embodiment.

A packet transfer apparatus 60 of the sixth embodiment shown in FIG. 9 has a function of recording and displaying, as an illicit access log, detailed information including at least one of the presence, structure, format, receiving time, and transmission source of a received packet which is determined by a packet analyzing mechanism 65 as a packet related to an illicit access.

For a received packet determined by the packet analyzing mechanism 65 as a packet related to an illicit access, an illicit access log holding mechanism 66 acquires detailed information such as the presence, receiving time, or transmission source of the packet from the packet analyzing mechanism 65 and holds it.

An illicit access log display mechanism 67 displays the illicit access log held by the illicit access log holding mechanism 66. FIGS. 10 and 11 show detailed examples of the illicit access log display mechanism 67.

In the packet transfer apparatus 60 having the arrangement shown in FIG. 9, a packet identifier adding mechanism 62 adds an identifier unique in the apparatus to a received packet received by a packet receiving section 61.

The received packet having an identifier added by the packet identifier adding mechanism 62 is stored in a packet hold queue 63 and also transferred to the packet analyzing mechanism 65.

The packet analyzing mechanism 65 which has received the received packet from the packet identifier adding mechanism 62 analyzes the packet on the basis of determination information stored in a database 650 and determines whether the received packet is related to an illicit access.

When a packet related to an illicit access is received through the packet receiving section 61, the packet analyzing mechanism 65 determines that the received packet is an illicit access. As in the above-described embodiments, the packet analyzing mechanism 65 does not send the identifier of the received packet to a packet sending section 64, so the packet related to an illicit access is not transferred to a receiving-side network segment.

In the sixth embodiment, when the packet analyzing mechanism 65 determines that the packet is related to an illicit access, information such as the presence, receiving time, transmission source, transmission destination, or type of illicit access is sent to the illicit access log holding mechanism 66 as illicit access log information.

The illicit access log holding mechanism 66 holds the illicit access log acquired from the packet analyzing mechanism 65 and holds it until the user performs operation of erasing the illicit access log.

The illicit access log display mechanism 67 displays the contents of illicit access log information such as the presence, receiving time, transmission source, transmission destination, of the packet related to an illicit access, or the type of illicitness determined by the packet analyzing mechanism 65, which is held by the illicit access log holding mechanism 66.

Figure 10:
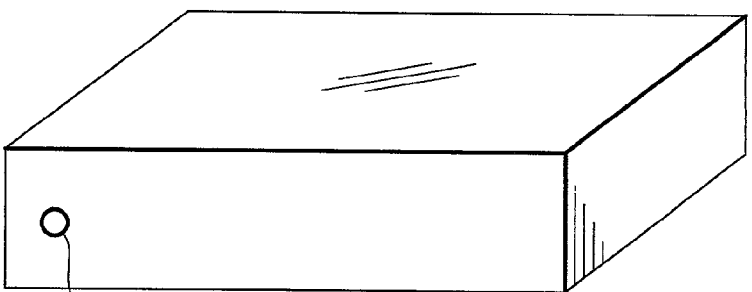
FIG. 10 is a view showing the first example of the illicit access display means in the sixth embodiment.
Figure 11:
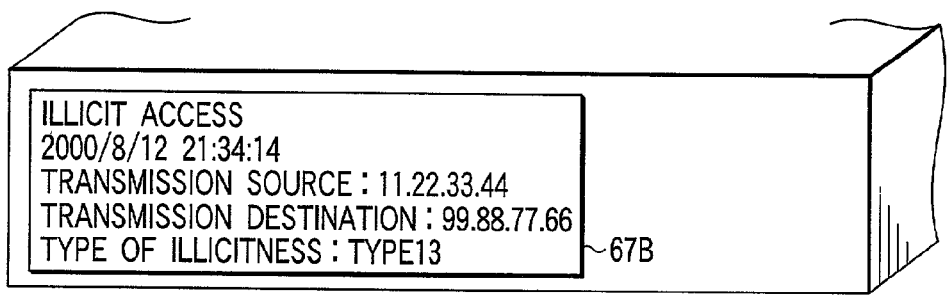
FIG. 11 is a view showing the second example of the illicit access display means in the sixth embodiment.

As a detailed arrangement of the illicit access log display mechanism 67, an illicit access indicator 67A using, e.g., an LED is turned on to notify the user of the presence of an illicit access, as shown in FIG. 10. Alternatively, as shown in FIG. 11, the time, transmission source, transmission destination of the illicit access, and the type of illicitness are displayed on an illicit access display device 67B using, e.g., an LCD as character data to notify the user of detailed information such as the time, transmission source, transmission destination of the illicit access and the type of illicitness. A switch for displaying preceding log information may be prepared such that the user can check preceding illicit access log information.

The seventh embodiment of the present invention will be described next with reference to FIGS. 12 through 15.

Figure 12:
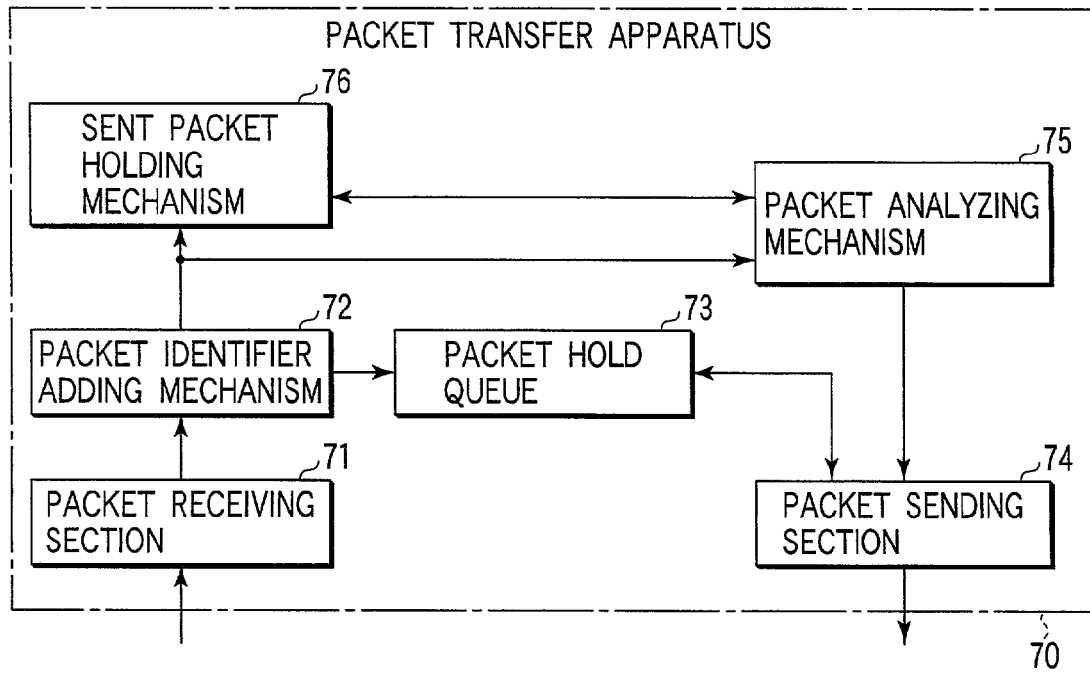
FIG. 12 is a block diagram showing the components of the main part of a packet transfer apparatus according to the seventh embodiment of the present invention.

FIG. 12 is a block diagram showing the components of the main part of a packet transfer apparatus according to the seventh embodiment of the present invention.

As a characteristic feature, a packet transfer apparatus 70 of the seventh embodiment shown in FIG. 12 has a sent packet holding mechanism 76 for holding sent packets which are looked up in packet analysis requiring a plurality of packets.

The sent packet holding mechanism 76 is looked up when a packet analyzing mechanism 75 analyzes a received packet and has a function of holding sent packets which have undergone analysis processing by the packet analyzing mechanism 75.

In analyzing a packet received by a packet receiving section 71 and having an identifier added by a packet identifier adding mechanism 72, the packet analyzing mechanism 75 looks up not only the received packet but also sent packets which are sent before the received packet and determines whether the packet is related to an illicit access.

In the packet transfer apparatus 70 having the arrangement shown in FIG. 12, a received packet received by the packet receiving section 71 and having an identifier added by the packet identifier adding mechanism 72 is stored in a packet hold queue 73 and transferred to the packet analyzing mechanism 75, and also held by the sent packet holding mechanism 76.

In sending the received packet transferred from the packet identifier adding mechanism 72, the packet analyzing mechanism 75 looks up determination information by a packet analysis program (to be described later) installed in the apparatus (a database may be looked up, as in the above embodiments) and packets sent before the received packet, which are held by the sent packet holding mechanism 76, and determines whether the received packet transferred from the packet identifier adding mechanism 72 is a packet related to an illicit access.

If it is determined on the basis of analysis by the packet analysis program that the received packet is a packet related to an illicit access, the packet analyzing mechanism 75 discards the received packet (packet of an illicit access) held by the sent packet holding mechanism 76. In subsequent analysis, since only sent packets are looked up, more accurate analysis can be performed.

A mechanism for allowing the sent packet holding mechanism 76 to store a new packet is arranged, using a method of discarding held packets when a predetermined period has elapsed from storage, or a method of discarding packets beyond a specific data amount designated for each destination in the order of arrival.

The sent packet holding mechanism 76 has, e.g., a function of extracting only packets addressed to a specific destination or a function of rearranging packets in the order of serial numbers contained in the packets and extracting them such that the packet analyzing mechanism 75 can be easily looked up for sent packets. With this arrangement, for example, even when a specific data string that is known to cause a bug in an application program or OS is sent across a plurality of packets, and these packets related to the illicit access may be missed only by individually determining received packets, the packets can be detected.

Figure 13:
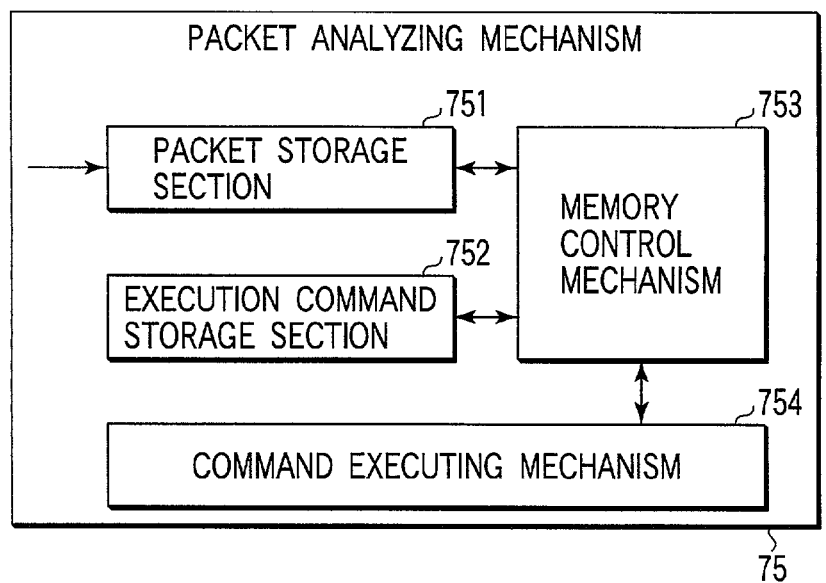
FIG. 13 is a block diagram showing the arrangement of a packet analyzing mechanism in the seventh embodiment.

FIG. 13 is a block diagram showing the arrangement of a packet analyzing mechanism using the above-described packet analysis program. The packet analyzing mechanism 75 in the seventh embodiment shown in FIG. 12 will be exemplified here. A packet analyzing mechanism may be used in place of the illicit packet analysis database of each of the first to sixth embodiments.

In the packet analyzing mechanism 75 of the packet transfer apparatus shown in FIG. 13, a processing function of determining a packet related to an illicit access in the form of an execution program is implemented.

In the packet analyzing mechanism 75 shown in FIG. 13, a packet storage section 751 is a storage device accessed from a command executing mechanism 754 through a memory control mechanism 753, and stores received packets having identifiers added by the packet identifier adding mechanism 72 or sent packets held by the sent packet holding mechanism 76.

An execution command storage section 752 is a storage device for storing a packet analysis program necessary for operation of the command executing mechanism 754.

The memory control mechanism 753 has a function of exchanging stored data between the command executing mechanism 754 and the packet storage section 751, execution command storage section 752, or any other storage device on the basis of an access request from the command executing mechanism 754.

The command executing mechanism 754 executes packet analysis processing in accordance with the packet analysis program transferred from the memory control mechanism 753 to determine whether a packet stored in the packet storage section 751 is a packet related to an illicit access.

Whether a received packet is a packet related to an illicit access is determined in accordance with the execution result from the command executing mechanism 754. If the received packet is not a packet related to an illicit access, a packet sending section 74 (or sending segment determining mechanism 46 or 56 shown in FIG. 7 or 8) is notified of the identifier of the received packet so as to send the received packet.

Processing operation by the packet analyzing mechanism 75 having the arrangement shown in FIG. 13 will be described assuming that the packet transfer apparatus 70 shown in FIG. 12 is used.

In the packet analyzing mechanism 75 having the arrangement shown in FIG. 13, the execution command storage section 752 stores a packet analysis program necessary for operation of the command executing mechanism 754 in advance.

In the packet transfer apparatus 70 shown in FIG. 12, the packet identifier adding mechanism 72 adds an identifier to a packet received by the packet receiving section 71. The received packet having the added identifier is stored in the packet hold queue 73 and transferred to the packet analyzing mechanism 75, and simultaneously, stored in the sent packet holding mechanism 76. The packet transferred to the packet analyzing mechanism 75 is stored in the packet storage section 751.

To store the packet in the packet storage section 751, the received packet is copied from the packet identifier adding mechanism 72 or sent packet holding mechanism 76, or the storage device (packet storage section 751) is shared by the packet identifier adding mechanism 72 or sent packet holding mechanism 76. When the sent packet holding mechanism 76 is prepared, sent packets held by the sent packet holding mechanism 76 may also be stored in the packet storage section 751.

When storage of the packet in the packet storage section 751 is ended, the command executing mechanism 754 starts operating. The command executing mechanism 754 sequentially reads out from the start the packet analysis program (execution program) stored in the execution command storage section 752 through the memory control mechanism 753, thereby executing sending processing.

For example, assume that it is analyzed whether a character string contained in a packet related to an illicit access is contained in the received packet stored in the packet storage section 751. Part of the packet analysis program stored in the execution command storage section 752 includes a list of character strings contained in packets related to illicit accesses. The command executing mechanism 754 sequentially compares the received packet with each of the character strings included in the character string list. When one of the character strings included in the character string list is contained in the received packet, it is determined that the received packet is related to an illicit access.

The command executing mechanism 754 can have a function of extracting sent packets from the sent packet holding mechanism 76 and storing it in the packet storage section 751 using the function of the sent packet holding mechanism 76, e.g., the function of extracting only received packets addressed to a specific destination or the function of rearranging packets in the order of serial numbers contained in the packets and extracting them, in accordance with the packet analysis program stored in the execution command storage section 752.

The command executing mechanism 754 executes processing to the end of the packet analysis program, thereby determining whether the received packet is related to an illicit access.

With the function of determining a packet related to an illicit access, for example, when a plurality of data strings including some different parts are present as specific data strings that are known to cause an operation error in OS, comparison of common parts can be ended at once, so it can be determined at a higher speed whether the packet is related to an illicit access. In addition, when the execution program in the execution command storage section 752 is exchanged during a period when the operation of the command executing mechanism 754 is stopped, analysis starts for the next received packet in accordance with the new execution program. Hence, the illicit access analysis means of the packet analyzing mechanism 75 can be easily updated.

Figure 14:
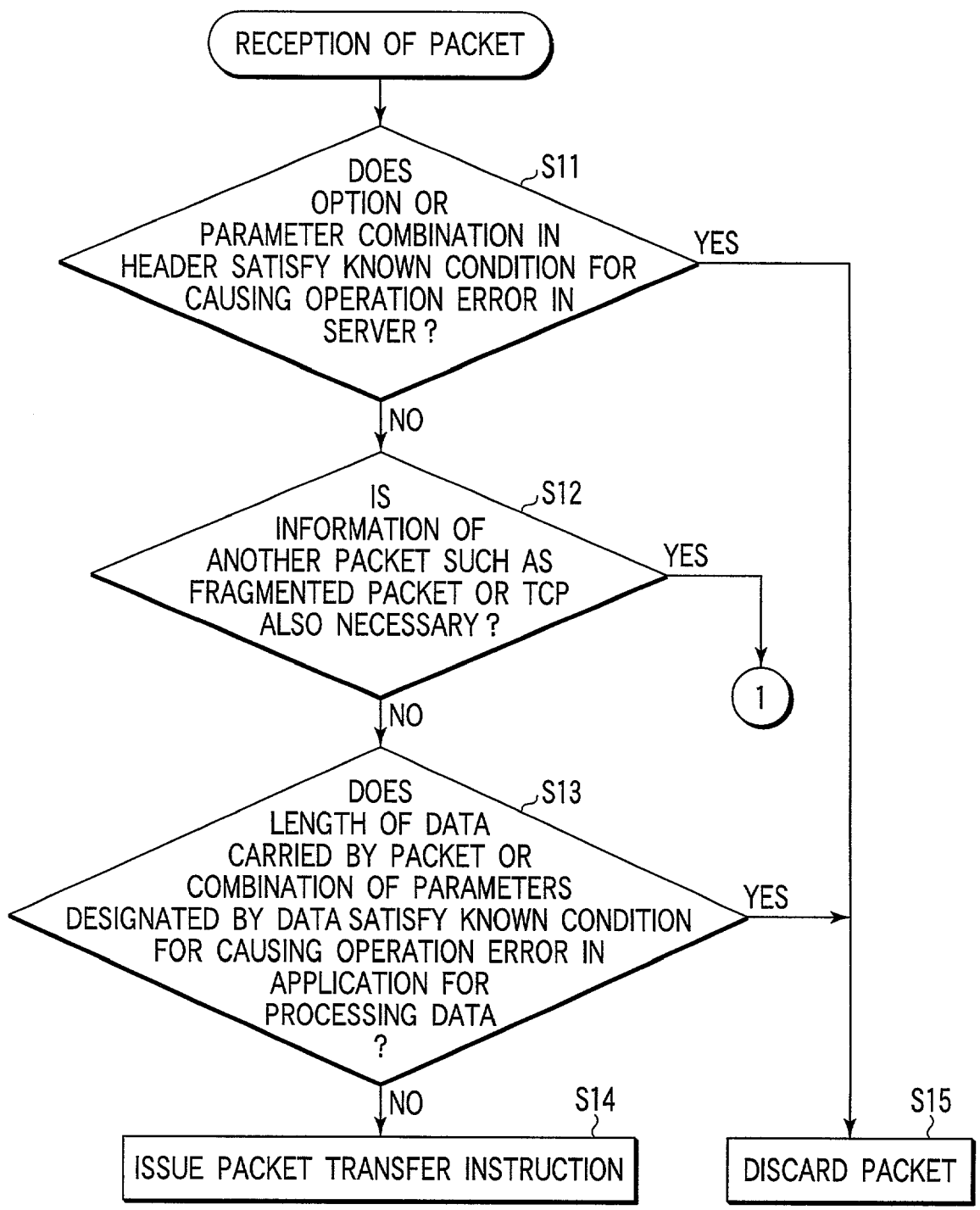
FIG. 14 is a flow chart showing the processing procedure of determination processing for a packet related to an illicit access in the seventh embodiment.
Figure 15:
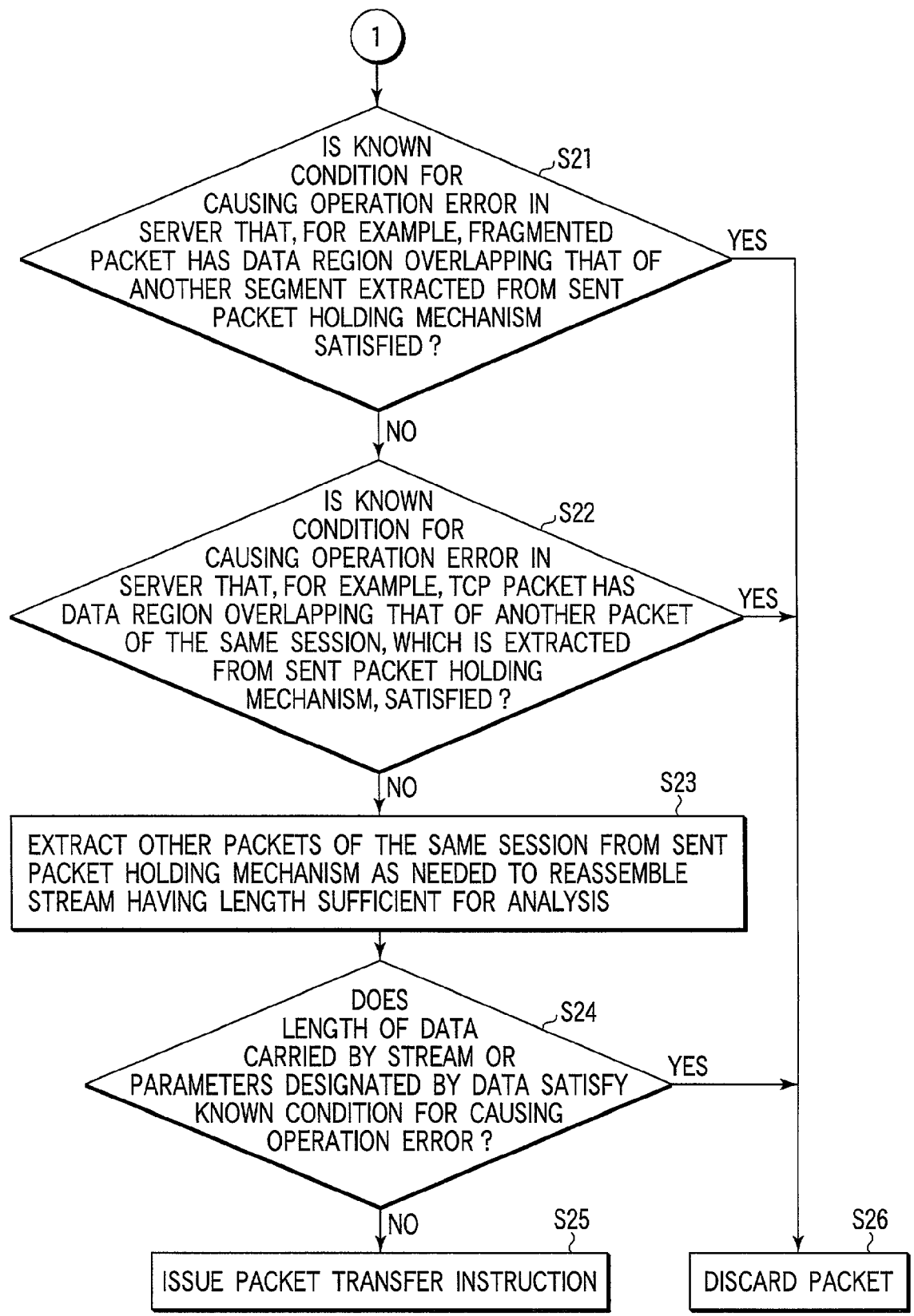
FIG. 15 is a flow chart showing the processing procedure of determination processing for a packet related to an illicit access in the seventh embodiment.

FIGS. 14 and 15 are flow charts showing the detailed processing procedure of determination processing for a packet related to an illicit access, which is performed when the command executing mechanism 754 executes the packet analysis program stored in the execution command storage section 752.

In determination processing shown in FIGS. 14 and 15, for a received packet stored in the packet storage section 751, it is determined first whether the option or parameter combination in the header field satisfies a preset known condition for causing an operation error in server at the packet transfer destination (step S11 in FIG. 14). That is, processing of determining from the header field of the received packet whether the transmission is from a suspicious party or the packet is a doubtful packet having a different format is performed.

If YES in step S1, the received packet is discarded (step S15 in FIG. 14). If NO in step S11, it is determined next whether information of another packet such as a fragmented packet or TCP is also necessary (step S12 in FIG. 14).

If NO in step S12, it is determined next whether the length of data carried by the packet or the combination of parameters designated by the data satisfies a preset known condition for causing an operation error in the application for processing the data (step S13 in FIG. 14).

If YES in step S13, the received packet is discarded (step S15 in FIG. 14). If NO in step S13, the packet sending section 74 is instructed to transfer the received packet as a sending target packet (step S14 in FIG. 14).

If YES in step S12, it is determined whether a preset known condition for causing an operation error in server that, e.g., a segmented packet has a data region overlapping that of another segmented packet extracted from the sent packet holding mechanism 76 is satisfied (step S21 in FIG. 15).

If YES in step S21, the received packet is discarded (step S26 in FIG. 15). If NO in step S21, it is determined whether a preset known condition for causing an operation error in server that, e.g., a TCP packet has a data region overlapping that of another packet of the same session, which is extracted from the sent packet holding mechanism 76, is satisfied (step S22 in FIG. 15).

If YES in step S22, the received packet is discarded (step S26 in FIG. 15). If NO in step S22, a necessary number of packets of the same session are extracted from the sent packet holding mechanism 76 to reassemble a data stream having a sufficient length for analysis (step S23 in FIG. 15), and it is determined whether the length of data carried by the TCP data stream or parameters designated by the data satisfy a preset known condition for causing an operation error (step S24 in FIG. 15).

If YES in step S24, the received packet is discarded (step S26 in FIG. 15). If NO in step S24, the packet sending section 74 is instructed to transfer the received packet (step S25 in FIG. 15).

Such determination processing for a packet related to an illicit access is sequentially executed for packets received by the packet receiving section 71.

With the above function of excluding a packet related to an illicit access, a packet transfer mechanism for preventing passage of a packet related to an illicit access that cannot be prevented only by determining whether the packet is to be transferred, on the basis of destination/transmission source MAC address, the destination/transmission source address or service number of an upper protocol, or the like can be implemented. In addition, a packet transfer mechanism for preventing passage of a packet related to an illicit access without user's setting to determine whether the packet is to be transferred can be implemented. Furthermore, since the apparatus has no network address such as an IP address, a packet transfer mechanism which prevents itself from becoming an illicit access target and prevents a packet related to an illicit access from passing can be implemented.

The execution program (packet analyzing program) stored in the above-described execution command storage section 752 can be provided by a storage medium or storage device such as a hard disk, CD-ROM, or semiconductor memory.

The eighth embodiment of the present invention will be described next with reference to FIG. 16.

Figure 16:
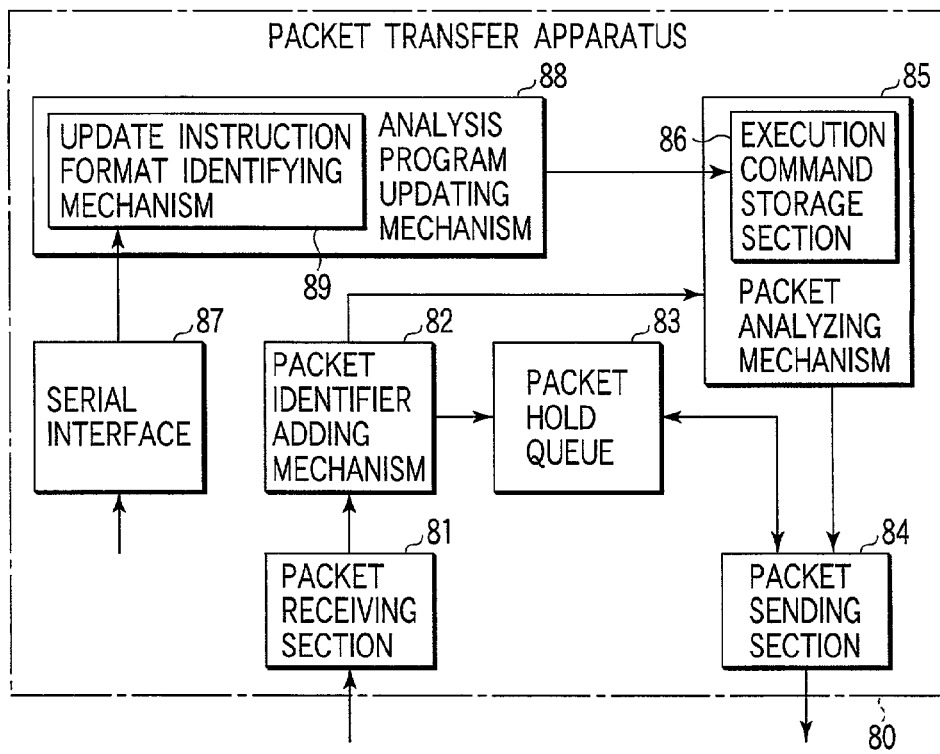
FIG. 16 is a block diagram showing the components of the main part of a packet transfer apparatus according to the eighth embodiment of the present invention.

FIG. 16 is a block diagram showing the components of the main part of a packet transfer apparatus according to the eighth embodiment of the present invention.

As a characteristic feature, a packet transfer apparatus 80 of the eighth embodiment shown in FIG. 16 has an additional function of updating a packet analysis program through a serial interface 87.

In the packet transfer apparatus 80 shown in FIG. 16, an execution command storage section 86 of a packet analyzing mechanism 85 stores an execution program for operation of a command executing mechanism (FIG. 13).

The serial interface 87 has a function of receiving an external analysis program update instruction. An analysis program updating mechanism 88 has a function of updating the execution program stored in the packet analyzing mechanism 85 in accordance with the analysis program update instruction received by the serial interface 87. An update instruction format identifying mechanism 89 has a function of determining whether the data received by the serial interface 87 is an analysis program update instruction by determining whether the received data satisfies a specific format.

The operation of the packet transfer apparatus 80 shown in FIG. 16 will be described.

Data received through the serial interface 87 is transferred to the analysis program updating mechanism 88. The analysis program updating mechanism 88 confirms by the update instruction format identifying mechanism 89 that the data received from the serial interface 87 is an analysis program update instruction that satisfies a specific format, and extracts the execution program contained in the analysis program update instruction.

The analysis program updating mechanism 88 also confirms that the command executing mechanism of the packet analyzing mechanism 85 is not operating. If the command executing mechanism is operating, stop of the operation is waited. When it is confirmed that the command executing mechanism of the packet analyzing mechanism 85 stops, the execution program contained in the analysis program update instruction is stored in the execution command storage section 86 of the packet analyzing mechanism 85. With this operation, the execution program for analyzing an illicit access in the packet analyzing mechanism 85 is updated.

The ninth embodiment of the present invention will be described next with reference to FIG. 17.

Figure 17:
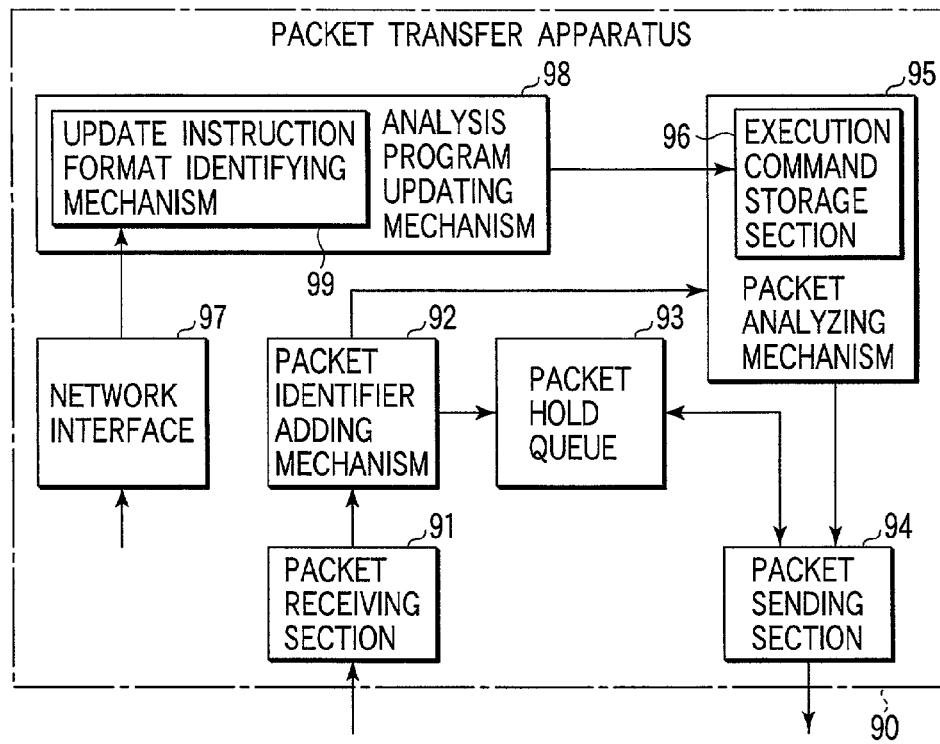
FIG. 17 is a block diagram showing the components of the main part of a packet transfer apparatus according to the ninth embodiment of the present invention.

FIG. 17 is a block diagram showing the components of the main part of a packet transfer apparatus according to the ninth embodiment of the present invention.

As a characteristic feature, a packet transfer apparatus 90 of the ninth embodiment shown in FIG. 17 has an additional function of updating a packet analysis program through a network interface 97. In the ninth embodiment, the serial interface 87 of the embodiment shown in FIG. 16 is replaced with the network interface 97. The remaining components are the same as in FIG. 16, and a detailed description thereof will be omitted.

The operation of the packet transfer apparatus 90 shown in FIG. 17 will be described next.

Data received through the network interface 97 is transferred to an analysis program updating mechanism 98. The analysis program updating mechanism 98 confirms by an update instruction format identifying mechanism 99 that the data received from the network interface 97 is an analysis program update instruction that satisfies a specific format, and extracts the execution program contained in the analysis program update instruction.

The analysis program updating mechanism 98 also confirms that the command executing mechanism of a packet analyzing mechanism 95 is not operating. If the command executing mechanism is operating, stop of the operation is waited. When it is confirmed that the command executing mechanism of the packet analyzing mechanism 95 stops, the execution program contained in the analysis program update instruction is stored in an execution command storage section 96 of the packet analyzing mechanism 95. With this operation, the execution program for analyzing an illicit access in the packet analyzing mechanism 95 is updated.

The 10th embodiment of the present invention will be described next with reference to FIG. 18.

Figure 18:
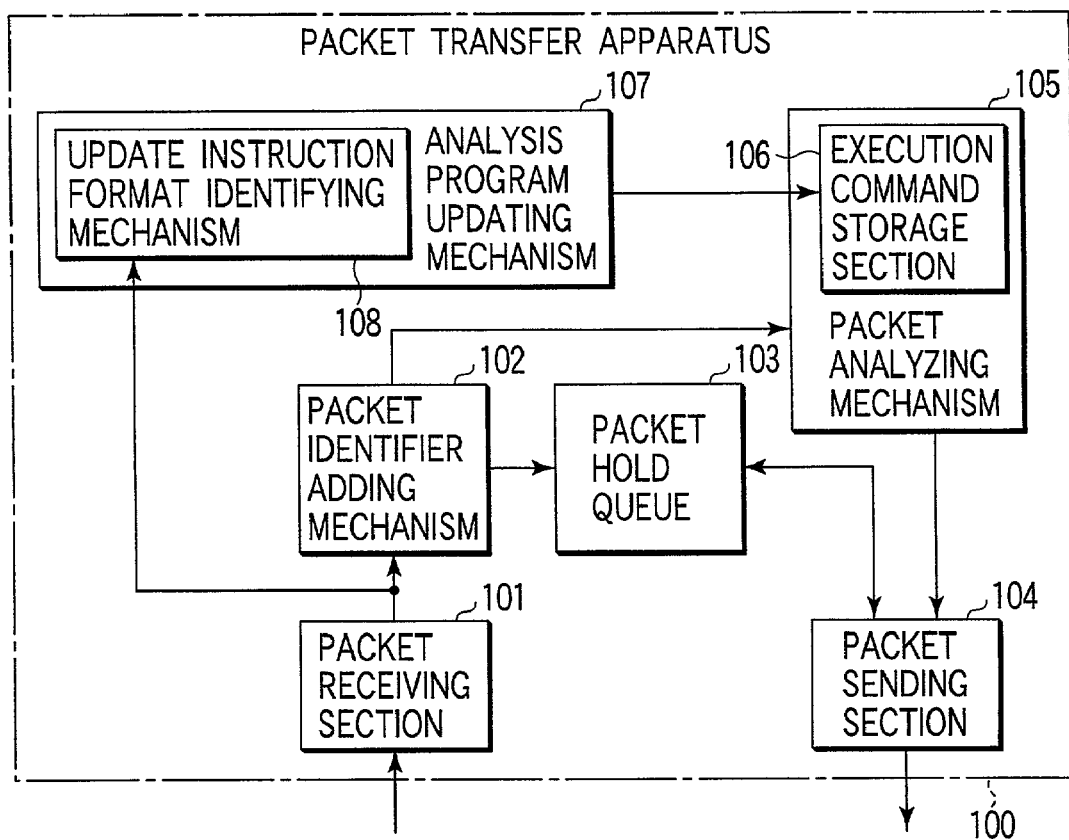
FIG. 18 is a block diagram showing the components of the main part of a packet transfer apparatus according to the 10th embodiment of the present invention.

FIG. 18 is a block diagram showing the components of the main part of a packet transfer apparatus according to the 10th embodiment of the present invention.

As a characteristic feature, a packet transfer apparatus 100 of the 10th embodiment shown in FIG. 18 has an additional function of updating an execution program (packet analysis program) using the received packets.

In the packet transfer apparatus 100 shown in FIG. 18, an execution command storage section 106 of a packet analyzing mechanism 105 stores an execution program for operation of the command executing mechanism (FIG. 13).

An analysis program updating mechanism 107 has a function of updating the execution program stored in the packet analyzing mechanism 105, in accordance with an analysis program update instruction received by the packet receiving section 101. An update instruction format identifying mechanism 108 in the analysis program updating mechanism 107 has a function of determining whether the received packet is an analysis program update instruction by determining whether the data of the input packet satisfies a specific format.

The operation of the packet transfer apparatus 100 shown in FIG. 18 will be described next.

A packet received by the packet receiving section 101 is transferred to a packet identifier adding mechanism 102 and also transferred to the analysis program updating mechanism 107. The update instruction format identifying mechanism 108 in the analysis program updating mechanism 107 determines whether the input received packet satisfies a specific format representing an analysis program update instruction. If the specific format is satisfied, the received packet is determined as not a packet to be transferred but an analysis program update instruction. The analysis program updating mechanism 107 extracts the execution program contained in the received packet, sends it to the packet analyzing mechanism 105, stores it in the execution command storage section 106.

In the above-described embodiments shown in FIGS. 16 through 18, the execution program stored in the execution command storage section of the packet analyzing mechanism is updated to prepare the environment for operation of the latest illicit access analysis program. However, the illicit access analysis program may be illicitly updated by an illicit analysis program update instruction to disable the normal operation of the packet analyzing mechanism.

Figure 19:
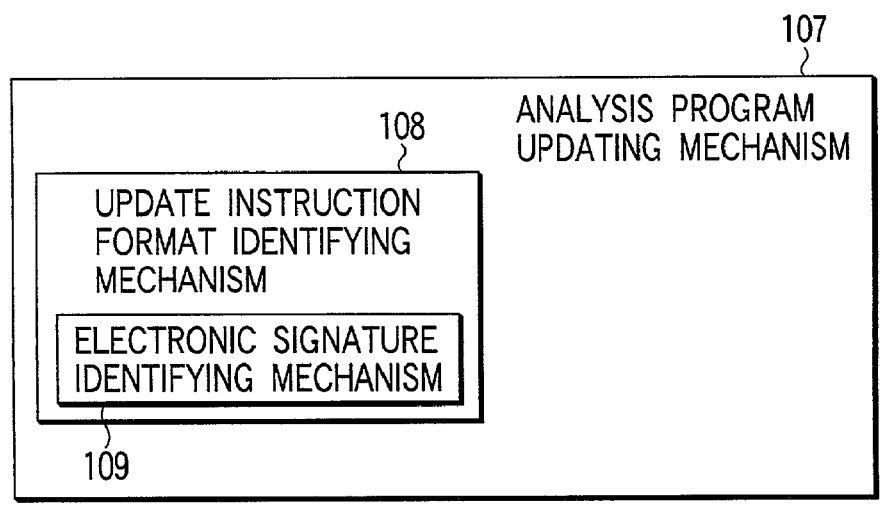
FIG. 19 is a block diagram showing the arrangement of an analysis program updating mechanism in the 10th embodiment.

To prevent this, an update instruction format identifying mechanism can have an electronic signature identifying mechanism to add an electronic signature to an analysis program update instruction and authenticate the analysis program update instruction, as shown in FIG. 19. This structure is applied to the 10th embodiment shown in FIG. 18. However, it can also be applied to the eighth embodiment shown in FIG. 16 or the ninth embodiment shown in FIG. 17.

FIG. 19 is a block diagram showing the arrangement of the analysis program updating mechanism 107. In this case, the analysis program updating mechanism 107 incorporates the update instruction format identifying mechanism 108, and the update instruction format identifying mechanism 108 incorporates an electronic signature identifying mechanism 109.

The electronic signature identifying mechanism 109 in the update instruction format identifying mechanism 108 confirms that the electronic signature contained in data received from the serial interface (FIG. 16) or network interface (FIG. 17) or data stored in a packet received by the packet receiving section (FIG. 18) is a valid signature. More specifically, when data representing an analysis program update instruction satisfies a specific format, and the electronic signature contained in this data is a valid signature, the data is determined as a valid analysis program update instruction.

The analysis program updating mechanism 107 has a function of outputting the illicit access analysis program contained in the analysis program update instruction to the packet analyzing mechanism 105 when the update instruction format identifying mechanism 108 confirms that the analysis program update instruction is valid.

In the above arrangement, when the data transferred to the analysis program updating mechanism 107 satisfies a specific format representing an analysis program update instruction, and the electronic signature identifying mechanism 109 confirms that the electronic signature contained in the data is valid, the analysis program updating mechanism 107 determines that the data is a valid analysis program update instruction, extracts the illicit access analysis program contained in the data and sends the program to the packet analyzing mechanism 105. The packet analyzing mechanism 105 stores the illicit access analysis program in the execution command storage section 106. Thus, a packet transfer apparatus capable of preventing an illicit analysis program update instruction from disabling the normal operation of the packet analyzing mechanism can be implemented.

The 11th embodiment of the present invention will be described with reference to FIG. 20.

Figure 20:
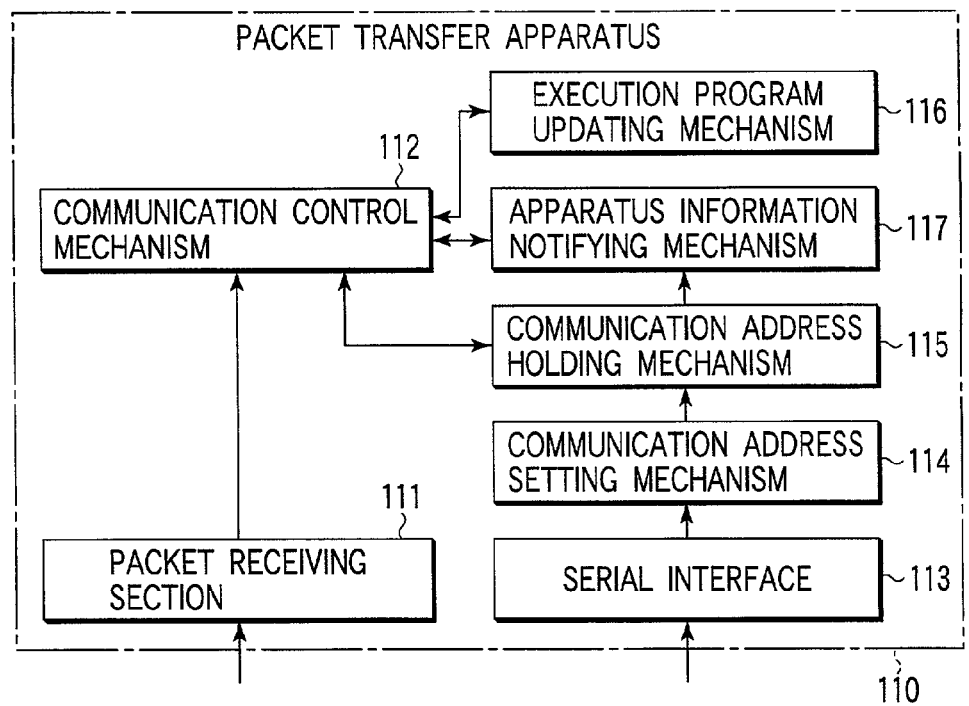
FIG. 20 is a block diagram showing the components of the main part of a packet transfer apparatus according to the 11th embodiment of the present invention.

FIG. 20 is a block diagram showing the components of the main part of a packet transfer apparatus according to the 11th embodiment of the present invention. As a characteristic feature, a packet transfer apparatus 110 of the 11th embodiment has a function of presetting a communication address.

In the packet transfer apparatus 110 shown in FIG. 20, a communication address setting mechanism 114 has a function of setting a communication address obtained through a serial interface or network interface into a communication address holding mechanism 115. In the example shown in FIG. 20, a communication address is set through a serial interface 113.

The communication address holding mechanism 115 has a function of holding a communication address preset by the communication address setting mechanism 114.

A communication control mechanism 112 is a device for controlling communication for update of a packet analysis program or communication with which an apparatus information notifying mechanism 117 notifies another device connected to a network segment (these communications will be referred to as specific communication hereinafter), and has a function of discarding a packet for the communication address when the specific communication is not to be performed. When specific communication is to be performed, the communication control mechanism 112 has a function of receiving a packet for the communication address and transferring data related to the specific communication, which is stored in the packet, to an execution program updating mechanism 116 or apparatus information notifying mechanism 117. In data communication related to the specific communication, the communication control mechanism 112 has a function of adding the communication address as a transmission source to data to be transmitted by the execution program updating mechanism 116 or apparatus information notifying mechanism 117 and sending the resultant data to the network segment.

The packet transfer apparatus 110 of this embodiment has the apparatus information notifying mechanism 117 for notifying an external device of, e.g., an illicit access log held by the illicit access log holding mechanism 66 shown in FIG. 9 or other information in the apparatus. The apparatus information notifying mechanism 117 uses a serial interface or communication network interface to notify an external device of information in the apparatus. The apparatus information notifying mechanism 117 can also use a network segment connected to the packet receiving section or packet sending section as a packet transfer target in order to notify an external device of information in the apparatus. In this case, the apparatus need have a network address which is absent during the normal operation to prevent itself from becoming an illicit access target.

The operation of the packet transfer apparatus 110 shown in FIG. 20 will be described.

The user presets a communication address in the communication address holding mechanism 115 using the communication address setting mechanism 114. In the arrangement shown in FIG. 20, the communication address setting mechanism 114 is used through the serial interface 113. However, the communication address setting mechanism 114 can also be used using a network interface or through a network segment as a transfer target in the same way as that for an analysis program update instruction.

For specific communication, when a packet for the communication address (address held by the communication address holding mechanism 115) is transmitted from a network segment through a packet receiving section 111, the communication control mechanism 112 receives this packet and transfers data related to communication, which is contained in the received packet, to the execution program updating mechanism 116 or apparatus information notifying mechanism 117. The execution program updating mechanism 116 or apparatus information notifying mechanism 117 sends the transmission data related to specific communication to the network segment as a transmission source indicated by the communication address. However, when communication is not to be performed, the communication control mechanism 112 discards the packet for the communication address to prevent itself from becoming an illicit access target.

The 12th embodiment of the present invention will be described next with reference to FIGS. 21 and 22.

Figure 21:
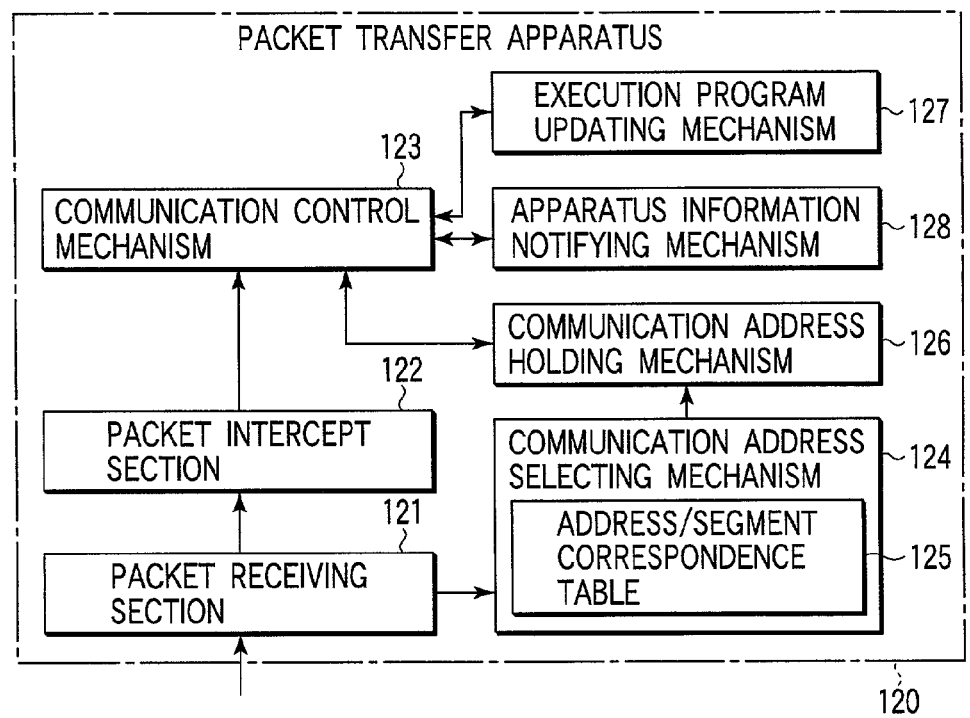
FIG. 21 is a block diagram showing the components of the main part of a packet transfer apparatus according to the 12th embodiment of the present invention.

FIG. 21 is a block diagram showing the components of the main part of a packet transfer apparatus according to the 12th embodiment of the present invention. As a characteristic feature, a packet transfer apparatus 120 of the 12th embodiment shown in FIG. 21 has a packet intercept section 122.

In the packet transfer apparatus 120 shown in FIG. 21, a communication address selecting mechanism 124 has an address/segment correspondence table 125 for holding the correspondence between the network addresses of packets received in the past and network segments that have received the packets, and has a function of selecting, as a communication address, an arbitrary one of transmission source addresses of packets received in the past from a network segment different from the transmission destination network segment of a packet related to the specific communication, and setting the selected communication address in a communication address holding mechanism 126.

FIG. 22 shows an example of the address/segment correspondence table 125.

The communication address holding mechanism 126 has a function of holding the communication address set by the communication address selecting mechanism 124.

The packet intercept section 122 has a function of intercepting a packet for the communication address without transferring the packet to the packet identifier adding mechanism when specific communication is to be performed.

A communication control mechanism 123 controls the specific communication and transfers data related to communication, which is contained in a received packet, to an execution program updating mechanism 127 or apparatus information notifying mechanism 128. The communication control mechanism 123 also has a function of adding the communication address as a transmission source to data to be transmitted by the execution program updating mechanism 127 or apparatus information notifying mechanism 128 and sending the data to a network segment.

The operation of the packet transfer apparatus 120 shown in FIG. 21 will be described next.

The communication address selecting mechanism 124 looks up the internal address/segment correspondence table 125 and selects, as a communication address, one of transmission source addresses of packets received in the past from a network segment different from the transmission destination network segment of a packet by related to specific communication.

Assume that the correspondence between addresses and network segments, which is held in the address/segment correspondence table 125, has, e.g., contents shown in FIG. 22. If the other party of the specific communication has network address [192.168.7.42], the network segment which should send the packet related to the specific communication is a network segment B.

Hence, a network segment different from the network segment (segment B) which should send the packet related to the specific communication is a network segment A. As a communication address, [192.168.0.21] or [192.168.3.134] is selected.

For example, when the segment A closet to the start of the address/segment correspondence table 125 is selected, the address is [192.168.0.21]. If the network address of the other party of the specific communication is not present on the address/segment correspondence table 125, an arbitrary one of addresses on the respective network segments is selected, and address setting is done using the selected address. As the result of address setting, when a response packet of address setting can be received on any one of the network segments, the network address and network segment of the other party of the communication are registered in the address/segment correspondence table 125, so the network address is newly selected as a communication address.

When the communication address is selected in the above manner, a response packet for which the communication address is designated is transmitted to a packet receiving section 121 of the packet transfer apparatus 120. When the specific communication is not to be performed, the packet intercept section 122 transfers the packet for the communication address of the segment A to the packet identifier adding mechanism, thereby executing normal transfer processing. On the other hand, when the specific communication is to be performed, the packet intercept section 122 intercepts the packet for the communication address of the segment A, thereby preventing the packet from being transferred to the authentic assignee of the communication address.

The packet intercept section 122 can minimize the interference on communication of the authentic assignee of the communication address by intercepting only a response packet from a network segment corresponding to the packet sent by the communication control mechanism 123. In this case, for discrimination between the communication of the apparatus and that of the authentic assignee of the communication address, a mechanism for, e.g., storing the port number or the like used by the authentic assignee of the communication address for communication through the packet transfer apparatus 120 of this embodiment and allowing discrimination between communication of the apparatus and that of the authentic assignee of the communication address using another port number must be prepared. This enables communication for analysis program update or specific communication with which the apparatus information notifying mechanism notifies another device of information in the apparatus while preventing an illicit access to itself.

With the arrangement of the embodiment shown in FIG. 20 or 21, a packet transfer apparatus which can prevent an illicit access to itself can be implemented because the apparatus has no network address except for specific communication such as communication for analysis program update or communication with which the apparatus information notifying mechanism notifies another device of information in the apparatus.

The 13th embodiment of the present invention will be described next with reference to FIGS. 23 and 24.

FIG. 23 is a block diagram showing the components of the main part of a packet transfer apparatus according to the 13th embodiment of the present invention. As a characteristic feature, a packet transfer apparatus 130 of the 13th embodiment shown in FIG. 23 has a communication start instruction format identifying mechanism 133.

The communication start instruction format identifying mechanism 133 has a function of identifying that a packet received by a packet receiving section 131 is data that satisfies a specific format representing a communication start instruction and notifying a communication control mechanism 134 of the start of communication.

The communication control mechanism 134 has a function of, upon receiving the notification of the start of communication from the communication start instruction format identifying mechanism 133, starting communication using a communication address held by a communication address holding mechanism 136 or a communication address selected by a communication address selecting mechanism 135.

The operation of the packet transfer apparatus 130 shown in FIG. 23 will be described next.

According to the arrangement of the embodiment shown in FIG. 20 or 21, when a packet transfer apparatus having no network address except for specific communication is performed, communication from the packet transfer apparatus of the embodiment to another device can be started, though communication from another device to the packet transfer apparatus of the embodiment cannot be started because the absence of a network address. The packet transfer apparatus 130 of the 13th embodiment shown in FIG. 23 has the communication start instruction format identifying mechanism 133 such that communication from another device to the packet transfer apparatus 130 can be started.

A packet received by the packet receiving section 131 is transferred to a packet identifier adding mechanism (FIGS. 4 through 9) and also transferred to the communication start instruction format identifying mechanism 133. The communication start instruction format identifying mechanism 133 determines whether the format of the received packet satisfies a specific format representing a communication start instruction.

When the format satisfies the specific format, it is determined that the received packet is not a packet to be sent to a network segment but a communication start instruction for the packet transfer apparatus 130, and the communication control mechanism 134 instructs the start of communication. In the example shown in FIG. 23, assume that the communication control mechanism 134 starts communication using a communication address selected by the communication address selecting mechanism 135.

With this arrangement, a packet transfer function capable of preventing an illicit access to itself because the packet transfer apparatus 130 has no network address except during specific communication such as communication for analysis program update or communication with which an apparatus information notifying mechanism 138 notifies another device of information in the apparatus and also starting communication from another device to the packet transfer apparatus 130 can be implemented.

In the above embodiment, when a function of starting communication from an external device is prepared, communication may be started by an illicit communication start instruction, so the apparatus itself may be an illicit access target. To prevent this, the communication start instruction format identifying mechanism 133 can have an electronic signature identifying mechanism 139 to add an electronic signature to a communication start instruction and authenticate the communication start instruction, as shown in FIG. 24.

As shown in FIG. 24, the communication start instruction format identifying mechanism 133 incorporates the electronic signature identifying mechanism 139. The electronic signature identifying mechanism 139 confirms that the electronic signature contained in the data of a communication start instruction is a valid signature. If the electronic signature is valid, it is determined that the data is a valid communication start instruction, and the communication control mechanism 134 is instructed to start communication.

Upon receiving notification of the start of communication from the communication start instruction format identifying mechanism 133, the communication control mechanism 134 starts communication using a communication address held by the communication address holding mechanism 136 or the communication address selected by the communication address selecting mechanism 135.

With this arrangement, a packet transfer apparatus capable of preventing communication from being started by an illicit communication start instruction and itself from becoming an illicit access target can be implemented.

The packet sending program used in the embodiments shown in FIGS. 16 through 23 may be provided for each apparatus by a storage medium or storage device such as a hard disk, CD-ROM, or semiconductor memory.

According to the above-described embodiments of the present invention, a packet transfer apparatus capable of preventing passage of a packet related to an illicit access that cannot be prevented only by determining whether a packet is to be transferred, on the basis of, e.g., destination/transmission source MAC address, the destination/transmission source address or service number of an upper protocol can be implemented. In addition, a packet transfer apparatus for preventing passage of a packet related to an illicit access without user's setting to determine whether the packet is to be transferred can be implemented. Furthermore, a packet transfer apparatus capable of preventing passage of a packet related to an illicit access and preventing itself from becoming an illicit access target because of the absence of a network address such as an IP address can be implemented. Also, a packet transfer apparatus capable of displaying that an illicit access is being made can be implemented.

Figure 2:
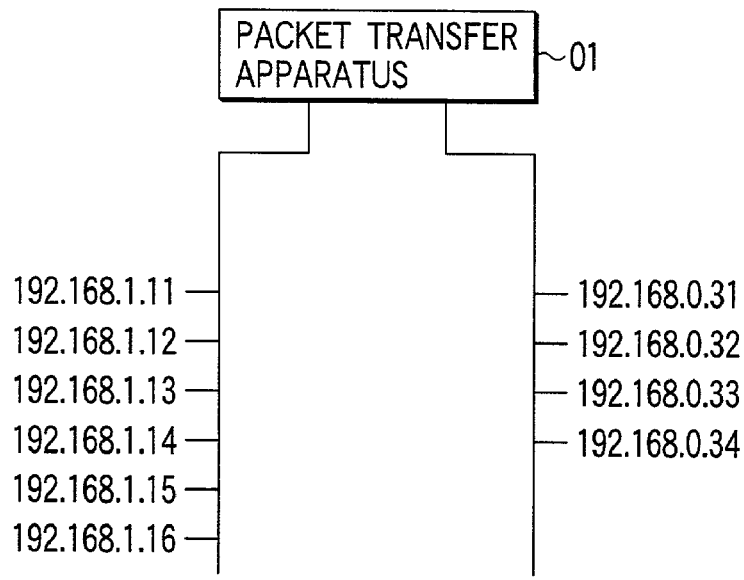
FIG. 2 is a block diagram showing the network arrangement of the conventional packet transfer apparatus shown in FIG. 1.

When the functions of the above embodiments are combined with an existing illicit access preventing function described with reference to FIGS. 1 through 3, a more reliable transfer preventing function for a packet related to an illicit access can be implemented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A packet transfer apparatus which is connected to at least first and second network segments and, when packets to be transferred between the first and second network segments include a packet for causing an illicit access, excludes the illicit packet, comprising:
receiving means for receiving a packet from the first network segment;
identifier adding means for adding an identifier to the received packet received by said receiving means;
a packet hold queue for temporarily holding the received packet having the added identifier;
packet analyzing means for determining whether the received packet is a packet related to an illicit access including a known preset operation error condition, and upon determining that the received packet is not the packet related to the illicit access, outputting the identifier of the received packet; and
sent packet holding means for holding a sent packet that was previously sent to the second network segment, before determining whether the received packet relates to the illicit access, for which said packet analyzing means determines that the packet is not the packet related to the received illicit access,
wherein in analyzing the received packet, said packet analyzing means looks up the sent packet held by said sent packet holding means and determines whether or not a combination of the received packet and the sent packet includes a factor that causes an operation error when software in the apparatus connected to the second network segment is executed sending means for receiving the identifier output from said packed analyzing means, extracting the received packet having the received identifier from said packed hold queue, and sending the received packet to the second network segment.

2. The apparatus according to claim 1, wherein the sending means further comprises:
sending segment determining means for receiving the identifier output from said packet analyzing means, extracting the received packet having the received identifier from said packet hold queue, and determining a network segment to which the received packet should be sent from a destination MAC address contained in the received packet; and
one or a plurality of packet sending means for sending the received packet to the network segment determined by said sending segment determining means.

3. The apparatus according to claim 1, wherein the sending means further comprises:
sending segment determining means for determining a sending destination network segment of the received packet from a destination MAC address contained in the received packet having the added identifier and moving the packet having the added identifier to said packet hold queue corresponding to the network segment; and
a plurality of packet sending means, arranged in correspondence with said packet hold queues, for receiving the identifier output from said packet analyzing means, extracting the received packet from one or said plurality of packet hold queues which hold the received packet having the identifier, and sending the received packet to the corresponding network segment.

4. The packet transfer apparatus according to claim 1, wherein the identifier added by the identifier adding means includes a numerical identifier identifying the received packet in the packet hold queue.

5. A packet transfer apparatus which is connected to at least first and second network segments and, when packets to be transferred between the first and second network segments include a packet for causing an illicit access, excludes the illicit packet, comprising:
receiving means for receiving a packet from the first network segment;
identifier adding means for adding an identifier to the received packet received by said receiving means;
a packet hold queue for temporarily holding the received packet having the added identifier;
packet analyzing means for determining whether the received packet is a packet related to an illicit access including a known preset operation error condition, and upon determining that the received packet is not the packet related to the illicit access, outputting the identifier of the received packet,
wherein said packet analyzing means comprises:
packet storage means for storing the received packet having the added identifier output from said packet queue;
program storage means for storing a packet analysis program which includes character strings contained in the packet related to the illicit access; and
program executing means for executing the packet analysis program determining whether the received packet stored in said packet storage means is the packet related to the illicit access containing the known operation error condition, and upon determining that the received packet is not the packet related to the illicit access, outputting the identifier of the received packet;
sending means for receiving the identifier output from said packet analyzing means, extracting the received packet having the received identifier from said packet hold queue, and sending the received packet to the second network segment; and
analysis program updating means for updating the packet analysis program stored in said program storage means.

6. An apparatus according to claim 5, wherein said analysis program updating means comprises a communication interface formed from a serial interface or a network interface, and
analysis program update instruction format identifying means for identifying that data received through said communication interface satisfies a specific format representing an analysis program update instruction, and
loads or updates the packet analysis program on the basis of the data identified as the analysis program update instruction by said analysis program update instruction format identifying means.

7. An apparatus according to claim 5, wherein said analysis program updating means comprises analysis program update instruction format identifying means for identifying that a packet received by said receiving means is data which satisfies a specific format representing an analysis program update instruction, and loads or updates the packet analysis program on the basis of the data of the received packet identified as the analysis program update instruction by said analysis program update instruction format identifying means.

8. An apparatus according to claim 7, wherein said update instruction format identifying means extracts electronic signature information from data in the packet, data input through the serial interface, or data input through the network interface, determines whether the electronic signature information is a valid signature, and upon determining that the electronic signature information is the valid signature, loads or updates the packet analysis program.

9. An apparatus according to claim 5, further comprising:
communication address setting means for presetting a transmission source address used for only specific communication as communication for setting or updating the packet analysis program or communication with which another device is notified of the detailed information of the illicit packet;
communication address holding means for holding the communication address set by said communication address setting means; and
communication control means for, when the specific communication is not to be performed, discarding a packet sent to the transmission source address, and only when the specific communication is to be performed, receiving the packet for the transmission source address.

10. An apparatus according to claim 9, further comprising communication start instruction format identifying means for identifying that a packet as a transfer target is data which satisfies a specific format representing a start instruction for the specific communication and starting the specific communication.

11. An apparatus according to claim 10, wherein said communication start instruction format identifying means comprises electronic signature identifying means for determining whether electronic signature contained in the data is a valid signature and only upon determining that the electronic signature is the valid signature, identifying that the data is a communication start instruction.

12. An apparatus according to claim 5, further comprising:
communication address selecting means for selecting one of transmission source addresses of packets received in the past from a network segment different from a sending destination network segment of specific communication as a transmission source address used for only the specific communication as communication for setting or updating the packet analysis program or communication with which another device is notified of the detailed information of the illicit packet; and
packet intercept means for intercepting a packet related to the specific communication from packets for the transmission source address selected by said communication address selecting means.

13. A packet transfer method for a packet transfer apparatus which is connected to at least first and second network segments and, when packets to be transferred between the first and second network segments include a packet for causing an illicit access, excludes the illicit packet, comprising:
receiving a packet from the first network segment;
adding an identifier to the received packet;
temporarily holding the received packet having the added identifier;
analyzing the received packet having the added identifier, determining that the received packet is not a packet related to an illicit access, by executing a packet analysis program and outputting the identifier of the received packet determined as a normal packet;
receiving the identifier, extracting the received packet having the received identifier from the received packets temporarily held, and sending the received packet to the second network segment; wherein the packet analysis program is updated upon receiving an update instruction from one of a serial interface, the network interface, and an independent network interface when it is identified that the received update instruction satisfies a specific format.

14. A method according to claim 13, further comprising determining whether an electronic signature contained in the received update instruction has is a valid signature in order to identify that the update instruction satisfies the specific format.

15. A method according to claim 13, further comprising:
presetting a transmission source address used for specific communication as communication for updating the packet analysis program or communication with which another device is notified of information in the apparatus;
receiving a packet for the transmission source address only during the specific communication; and
discarding the packet for the transmission source address while the specific communication is not performed.

16. A method according to claim 13, further comprising:
selecting in advance one of transmission source addresses of packets received in the past from a network segment different from a transmission destination network segment as a transmission source address for communication or a transmission source address used for specific communication as communication for updating the packet analysis program or communication with which another device is notified of information in the apparatus;
intercepting a packet related to the communication for the transmission source address only during the specific communication; and
transferring the packet for the transmission source address while the specific communication is not performed.

17. In an apparatus that connects to at least first and second network segments and, when packets to be transferred between the first and second network segments include a packet for causing an illicit access, excludes the illicit packet, a method comprising:
receiving a packet from the first network segment;
adding an identifier to the received packet;
temporarily holding the received packet having the added identifier; and a sent packet that was previously sent to the second network segment;
determining whether the received packet is a packet related to an illicit access including a known preset operation error condition, and upon determining that the received packet is not the packet related to the illicit access, outputting the identifier of the received packet;
wherein determining the illicit packet includes determining whether or not a combination of the received packet and the sent packet includes a factor that may cause an operation error when software in the apparatus connected to the second network segment is executed;
receiving the output identifier of the received packet, extracting the received packet having the received added identifier from said packet hold queue, and sending the received packet to the second network segment.

18. A computer-readable medium containing instructions for controlling an apparatus to perform a method, the apparatus being connected to at least first and second network segments and, when packets to be transferred between the first and second network segments include a packet for causing an illicit access, excluding the illicit packet, the method comprising:

receiving a packet from the first network segment;

adding an identifier to the received packet;

temporarily holding the received packet having the added identifier; and a sent packet that was previously sent to the second network segment;

determining whether the received packet is a packet related to an illicit access including a known preset operation error condition, and upon determining that the received packet is not the packet related to the illicit access, outputting the identifier of the received packet;

wherein determining the illicit packet includes determining whether or not a combination of the received packet and the sent packet includes a factor that may cause an operation error when software in the apparatus connected to the second network segment is executed;

receiving the output identifier of the received packet, extracting the received packet having the received output identifier from said packet hold queue, and sending the received packet to the second network segment.

19. A computer-readable medium containing instructions for controlling an apparatus to perform a method, the apparatus being connected to at least first and second network segments and, when packets to be transferred between the first and second network segments include a packet for causing an illicit access, excluding the illicit packet, the method comprising:

receiving a packet from the first network segment;

adding an identifier to the received packet;

temporarily holding the received packet having the added identifier;

analyzing the received packet having the added identifier, determining that the received packet is not a packet related to an illicit access, by executing a packet analysis program and outputting the identifier of the received packet determined as a normal packet;

receiving the identifier, extracting the received packet having the received identifier from the received packets temporarily held, and sending the received packet to the second network segment; wherein the packet analysis program is updated upon receiving an update instruction from one of a serial interface, the network interface, and an independent network interface when it is identified that the received update instruction satisfies a specific format.

* * * * *